US009540599B2

(12) United States Patent
Fernandes et al.

(10) Patent No.: US 9,540,599 B2
(45) Date of Patent: *Jan. 10, 2017

(54) LAUNDRY DETERGENT COMPOSITION COMPRISING A PARTICLE HAVING HUEING AGENT AND CLAY

(71) Applicant: Milliken & Company, Spartanburg, SC (US)

(72) Inventors: Gregory E. Fernandes, Greenville, SC (US); Dominick J. Valenti, Moore, SC (US); Patrick C. Stenger, Fairfield, OH (US); Gregory S. Miracle, Liberty Township, OH (US); Andrew P. Moon, Tyne and Wear (GB); Michael McDonnell, Northumberland (GB)

(73) Assignee: Milliken & Company, Spartanburg, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 13/868,260

(22) Filed: Apr. 23, 2013

(65) Prior Publication Data

US 2013/0303428 A1  Nov. 14, 2013

Related U.S. Application Data

(60) Provisional application No. 61/644,480, filed on May 9, 2012.

(51) Int. Cl.
| | | |
|---|---|---|
| *C11D 3/40* | (2006.01) |
| *C11D 3/12* | (2006.01) |
| *C11D 17/00* | (2006.01) |
| *C11D 17/06* | (2006.01) |
| *C11D 3/42* | (2006.01) |
| *C09B 67/08* | (2006.01) |
| *C09B 67/42* | (2006.01) |
| *C09B 67/02* | (2006.01) |

(52) U.S. Cl.
CPC ............ *C11D 3/42* (2013.01); *C09B 67/0007* (2013.01); *C09B 67/0092* (2013.01); *C09B 67/0095* (2013.01); *C09B 67/0097* (2013.01); *C11D 3/126* (2013.01); *C11D 3/40* (2013.01); *C11D 17/0034* (2013.01)

(58) Field of Classification Search
CPC ............ C09B 67/0007; C09B 67/0092; C09B 67/0095; C11D 17/0034; C11D 3/126; C11D 3/40; C11D 3/42
USPC ................ 510/394, 324, 307, 444, 507, 513
See application file for complete search history.

(56) References Cited

U.S. PATENT DOCUMENTS

| | | | | |
|---|---|---|---|---|
| 4,885,101 | A * | 12/1989 | Tai ................................. | 510/334 |
| 4,968,443 | A * | 11/1990 | Lambert et al. .................. | 8/137 |
| 2011/0053823 | A1 | 3/2011 | Fernandes et al. | |
| 2011/0294713 | A1 | 12/2011 | Fernandes | |
| 2011/0294716 | A1 | 12/2011 | Spanhove et al. | |
| 2012/0101018 | A1* | 4/2012 | Miracle et al. ................. | 510/324 |
| 2012/0101265 | A1* | 4/2012 | Mahaffey et al. ............. | 534/836 |
| 2012/0122750 | A1* | 5/2012 | Stenger et al. ................ | 510/299 |
| 2012/0122751 | A1* | 5/2012 | Stenger et al. ................ | 510/300 |
| 2012/0129751 | A1* | 5/2012 | Miracle et al. ................ | 510/295 |
| 2012/0129752 | A1* | 5/2012 | Stenger et al. ................ | 510/299 |
| 2012/0129753 | A1* | 5/2012 | Stenger et al. ................ | 510/300 |

FOREIGN PATENT DOCUMENTS

| | | |
|---|---|---|
| WO | WO 2006/053598 A1 | 5/2006 |
| WO | WO 2009/132870 A1 | 11/2009 |
| WO | WO 2010/151906 A2 | 12/2010 |
| WO | WO 2011/028249 A1 | 3/2011 |
| WO | WO 2012/054058 A1 | 4/2012 |
| WO | WO 2012/054823 A1 | 4/2012 |
| WO | WO 2012/054835 A1 * | 4/2012 |

OTHER PUBLICATIONS

International Search Report, International application No. PCT/US2013/039030, International filing date May 1, 2013.

* cited by examiner

*Primary Examiner* — Lorna Douyon
(74) *Attorney, Agent, or Firm* — Brenda D. Wentz

(57) ABSTRACT

The present invention relates to a laundry detergent composition comprising a particle comprising hueing agent and clay. The particle can be incorporated into laundry detergent products, such as a laundry detergent powder. The particle exhibits an excellent storage stability profile with very little bleeding of the hueing dye from the particle, exhibits excellent fabric deposition of the hueing dye during a laundering process without causing any spot staining of the fabric, and does not impact the visual appearance of a laundry detergent powder when incorporated therein.

15 Claims, No Drawings

… (1)

LAUNDRY DETERGENT COMPOSITION COMPRISING A PARTICLE HAVING HUEING AGENT AND CLAY

CROSS REFERENCE TO RELATED APPLICATIONS

This application claims priority to U.S. Provisional Patent Application No. 61/644,480, entitled "A Laundry Detergent Composition Comprising A Particle Having Hueing Agent and Clay," which was filed on May 9, 2012, and is entirely incorporated by reference herein.

FIELD OF THE INVENTION

The present invention relates to a laundry detergent composition comprising a particle comprising hueing agent and clay. The particle can be incorporated into laundry detergent products, such as a laundry detergent powder. The particle exhibits an excellent storage stability profile with very little bleeding of the hueing dye from the particle, exhibits excellent fabric deposition of the hueing dye during a laundering process without causing any spot staining of the fabric, and does not impact the visual appearance of a laundry detergent powder when incorporated therein.

BACKGROUND OF THE INVENTION

As textile substrates age, their color tends to fade or yellow due to exposure to light, air, soil, and natural degradation of the fibers that comprise the substrates. To counteract this unwanted effect, laundry detergent manufacturers incorporate hueing agents into their products. Thus, the purpose of hueing agents is typically to visually brighten these textile substrates and counteract the fading and yellowing of the textile substrates.

Detergent manufacturers continue to seek to incorporate hueing dyes into their laundry detergent products, especially their laundry detergent powders. Detergent manufacturers prefer to incorporate detergent ingredients into a spray-dried laundry detergent base powder, by crutching and spray-drying the detergent ingredients: as this is an easy and cost effective means for their incorporation. However, when hueing dyes are incorporated into the crutcher, their colour determines the colour of the spray-dried laundry detergent base powder, which may not be preferred by the consumer. This has led detergent manufacturers to design separate particles for their hueing dyes.

These particles need to exhibit good storage stability, especially in conditions of high humidity, the dye must not bleed out of the particle and affect the colour of the base laundry powder, this is especially important in the presence of non-ionic detersive surfactant that may be present in the detergent formulation, and especially when sprayed onto the bulk of the powder.

These hueing dye particles must still rapidly dissolve in water, even cold water, during the laundering process, and the particles must rapidly deposit dye onto the fabric without causing dye damage such as spot staining. The inventors have found that a unique combination of a specific type of hueing dye, when incorporated into a particle that additionally comprises clay, the resultant particle exhibits both good storage stability profile, good fabric deposition and does not impact the visual appearance of the base detergent powder when admixed thereto. The particle exhibits an excellent storage stability profile with very little bleeding of the hueing dye from the particle, exhibits excellent fabric deposition of the hueing dye during a laundering process without causing any spot staining of the fabric, and does not impact the visual appearance of a laundry detergent powder when incorporated therein.

SUMMARY OF THE INVENTION

A laundry detergent composition comprising a particle, wherein the particle comprises: (a) hueing agent, wherein the hueing agent has the following structure:

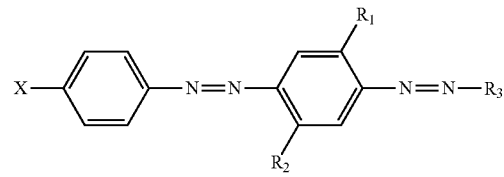

wherein: $R_1$ and $R_2$ are independently selected from the group consisting of: H; alkyl; alkoxy; alkyleneoxy; alkyl capped alkyleneoxy; urea; and amido; $R_3$ is a substituted aryl group; X is a substituted group comprising sulfonamide moiety and optionally an alkyl and/or aryl moiety, and wherein the substituent group comprises at least one alkyleneoxy chain that comprises an average molar distribution of at least four alkyleneoxy moieties; (b) clay; and (c) another detergent ingredient.

A particle comprising: (a) hueing agent, wherein the hueing agent has the following structure:

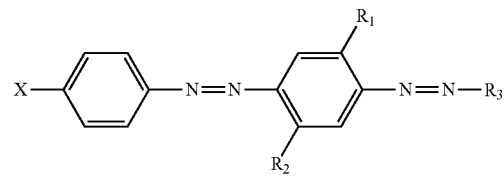

wherein:
$R_1$ and $R_2$ are independently selected from the group consisting of: H; alkyl; alkoxy; alkyleneoxy; alkyl capped alkyleneoxy; urea; and amido;
$R_3$ is a substituted aryl group;
X is a substituted group comprising sulfonamide moiety and optionally an alkyl and/or aryl moiety, and wherein the substituent group comprises at least one alkyleneoxy chain that comprises an average molar distribution of at least four alkyleneoxy moieties; and (b) clay.

A particle comprising: (a) hueing agent, wherein the hueing agent has the following structure:

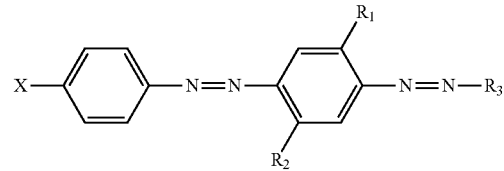

wherein:
$R_1$ and $R_2$ are independently selected from the group consisting of: H; alkyl; alkoxy; alkyleneoxy; alkyl capped alkyleneoxy; urea; and amido;
$R_3$ is a substituted aryl group;
X is a substituted group comprising sulfonamide moiety and optionally an alkyl and/or aryl moiety, and wherein the substituent group comprises at least one alkyleneoxy chain that comprises an average molar distribution of at least four alkyleneoxy moieties; and (b) natural clay.

A particle comprising: (a) hueing agent, wherein the hueing agent has the following structure:

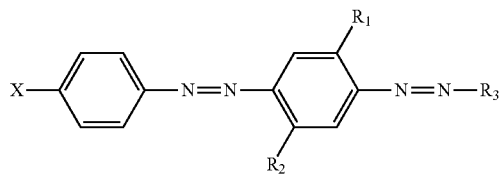

wherein:
R$_1$ and R$_2$ are independently selected from the group consisting of: H; alkyl; alkoxy; alkyleneoxy; alkyl capped alkyleneoxy; urea; and amido;
R$_3$ is a substituted aryl group;
X is a substituted group comprising sulfonamide moiety and optionally an alkyl and/or aryl moiety, and wherein the substituent group comprises at least one alkyleneoxy chain that comprises an average molar distribution of at least four alkyleneoxy moieties; and (b) natural bentonite clay.

DETAILED DESCRIPTION OF THE INVENTION

Particle:
The particle comprises hueing agent and clay. The hueing dye and clay are described in more detail below.

The particle preferably comprises from 0.0001 wt % to 4 wt % hueing dye, from 0.0001 wt % to 2 wt % hueing dye, from 0.0001 wt % to 1 wt % hueing dye, from 0.0001 wt % to 0.1 wt %, or even from 0.0001 wt % to 0.01 wt % hueing dye. The particle preferably comprises from 66% to 99.999 wt % clay, and preferably from 80 wt %, or even 90 wt % clay. The particle may comprise other ingredients, such as the solvent used to carry the hueing dye during the process of preparing the particle: such suitable solvents include any soluble or miscible material that is not a solid at room temperature, the solvent may be a liquid or a wax in its pure form at room temperature. The particle preferably comprises up to 33 wt % solvent, and preferably up to from 20 wt %, and more preferably up to 20 wt %, and more preferably up to 10%, and more preferably up to 5%, or even up to 4 wt % solvent. Some examples of suitable solvents include alkoxylated aromatic compounds (such as alkoxylates of m-toluidine), glycols (such as polyethylene glycol), alcohols (such as ethanol, propanol, hexanol, and butanol), solvents having a boiling point above 60° C. (such as dipropyl ether, ethylene glycol dimethyl ether, and toluene), and the like, and mixtures thereof. The alkoxylated form of m-toluidine may be alkoxylated with one or more of the following groups: ethylene oxide (EO), propylene oxide (PO), butylene oxide (BO), and any mixtures thereof. The average number of groups forming the alkoxylated portion of m-toluidine may be from about 1 to about 200, more preferably from about 1 to about 100, and most preferably from about 1 to about 50. The average number of ethylene oxide moieties forming the polyethylene glycol may be in the range of from about 1 to 200, preferably from 1 to 100, or even from 1 to 50. The particle may comprise other detergent ingredients, suitable detergent ingredients are described in more detail below.

The particle may have a weight average particle size of from 50 micrometers to 2,000 micrometers, preferably from 50 micrometers to 1,500 micrometers, or from 50 micrometers to 1,000 micrometers, or from 50 micrometers to 500 micrometers, or from 50 micrometer to 300 micrometers, or from 50 to 200 micrometers.

Laundry Detergent Composition:
The laundry detergent composition comprises the particle described in more detail above. The composition can be in any form, for example a liquid including gels, unit dose including tablet and pouch form, and solid form including solid particulate form. Typically, the composition is a fully formulated laundry detergent composition, not a portion thereof such as a spray-dried or agglomerated particle that only forms part of the laundry detergent composition. Preferably, the composition is in solid form, more preferably the composition is in solid free-flowing particulate form: preferably the composition is in the form of free flowing laundry detergent particles.

Typically, the composition comprises a plurality of chemically different particles, such as spray-dried base detergent particles and/or agglomerated base detergent particles and/or extruded base detergent particles, in combination with one or more, typically two or more, or three or more, or four or more, or five or more, or six or more, or even ten or more particles selected from: surfactant particles, including surfactant agglomerates, surfactant extrudates, surfactant needles, surfactant noodles, surfactant flakes; polymer particles such as cellulosic polymer particles, polyester particles, polyamine particles, terephthalate polymer particles, polyethylene glycol polymer particles; builder particles, such as sodium carbonate and sodium silicate co-builder particles, phosphate particles, zeolite particles, silicate salt particles, carbonate salt particles; filler particles such as sulphate salt particles; dye transfer inhibitor particles; dye fixative particles; bleach particles, such as percarbonate particles, especially coated percarbonate particles, such as percarbonate coated with carbonate salt, sulphate salt, silicate salt, borosilicate salt, or any combination thereof, perborate particles, bleach catalyst particles such as transition metal bleach catalyst particles, or oxaziridinium-based bleach catalyst particles, pre-formed peracid particles, especially coated pre-formed peracid particles, and co-bleach particles of bleach activator, source of hydrogen peroxide and optionally bleach catalyst; bleach activator particles such as oxybenzene sulphonate bleach activator particles and tetra acetyl ethylene diamine bleach activator particles; chelant particles such as chelant agglomerates; hueing dye particles; brightener particles; enzyme particles such as protease prills, lipase prills, cellulase prills, amylase prills, mannanase prills, pectate lyase prills, xyloglucanase prills, bleaching enzyme prills, cutinase prills and co-prills of any of these enzymes; clay particles such as montmorillonite particles or particles of clay and silicone; flocculant particles such as polyethylene oxide particles; wax particles such as wax agglomerates; perfume particles such as perfume microcapsules, especially melamine formaldehyde-based perfume microcapsules, starch encapsulated perfume accord particles, and pro-perfume particles such as Schiff base reaction product particles; aesthetic particles such as coloured noodles or needles or lamellae particles, and soap rings including coloured soap rings; and any combination thereof.

Detergent Ingredients:
The composition typically comprises detergent ingredients. Suitable detergent ingredients include: detersive surfactants including anionic detersive surfactants, non-ionic detersive surfactants, cationic detersive surfactants, zwitterionic detersive surfactants, amphoteric detersive surfactants, and any combination thereof; polymers including carboxylate polymers, polyethylene glycol polymers, polyester soil release polymers such as terephthalate polymers, amine polymers, cellulosic polymers, dye transfer inhibition polymers, dye lock polymers such as a condensation oligomer produced by condensation of imidazole and epichlorhydrin, optionally in ratio of 1:4:1, hexamethylenediamine derivative polymers, and any combination thereof; builders including zeolites, phosphates, citrate, and any combination thereof; buffers and alkalinity sources including carbonate salts and/or silicate salts; fillers including sulphate salts and bio-filler materials; bleach including bleach activators, sources of available oxygen, pre-formed peracids, bleach catalysts, reducing bleach, and any combination thereof; chelants; photobleach; hueing agents; brighteners; enzymes including proteases, amylases, cellulases, lipases, xyloguca-nases, pectate lyases, mannanases, bleaching enzymes, cutinases, and any combination thereof; fabric softeners including clay, silicones, quaternary ammonium fabric-softening agents, and any combination thereof; flocculants such as polyethylene oxide; perfume including starch encapsulated perfume accords, perfume microcapsules, perfume loaded zeolites, schif base reaction products of ketone perfume raw materials and polyamines, blooming perfumes, and any combination thereof; aesthetics including soap rings, lamellar aesthetic particles, geltin beads, carbonate and/or sulphate salt speckles, coloured clay, and any combination thereof: and any combination thereof.

Hueing Agent.

The hueing agent has the following structure:

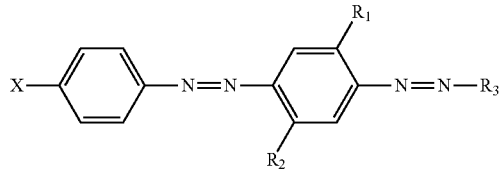

wherein: $R_1$ and $R_2$ are independently selected from the group consisting of: H; alkyl, preferably $C_1$ to $C_{10}$ alkyl; alkoxy, preferably $C_1$ to $C_{10}$ alkoxy; alkyleneoxy; alkyl capped alkyleneoxy; urea; and amido; $R_3$ is a substituted aryl group; X is a substituted group comprising sulfonamide moiety and optionally an alkyl, preferably $C_1$ to $C_{10}$ alkyl, and/or aryl moiety, and wherein the substituent group comprises at least one alkyleneoxy chain that comprises an average molar distribution of at least four alkyleneoxy moieties.

Preferably, the hueing agent has the following structure:

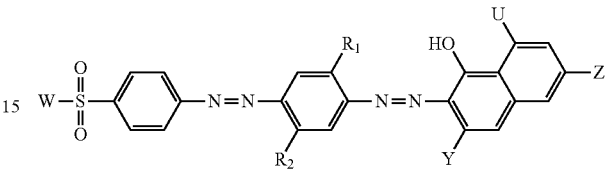

wherein: $R_1$ and $R_2$ are independently selected from the group consisting of: H; alkyl, preferably $C_1$ to $C_{10}$ alkyl; alkoxy, preferably $C_1$ to $C_{10}$ alkoxy; alkyleneoxy; alkyl capped alkyleneoxy; urea; and amido; U is a hydrogen, a substituted or unsubstituted amino group; W is a substituted group comprising an amino moiety and optionally an alkyl, preferably $C_1$ to $C_{10}$ alkyl, and/or aryl moiety, and wherein the substituted group comprises at least one alkyleneoxy chain that comprises an average molar distribution of at least four alkyleneoxy moieties; Y is a hydrogen or a sulfonic acid moiety; and Z is a sulfonic acid moiety or an amino group substituted with an aryl group or an alkyl group, preferably a $C_1$ to $C_{10}$ alkyl group.

Preferably, $R_1$ is an alkoxy group, preferably $C_1$ to $C_{10}$ alkoxy, and $R_2$ is an alkyl group, preferably $C_1$ to $C_{10}$ alkyl.

Suitable hueing agents include, but are not limited to, the following structures:

Formula BA1

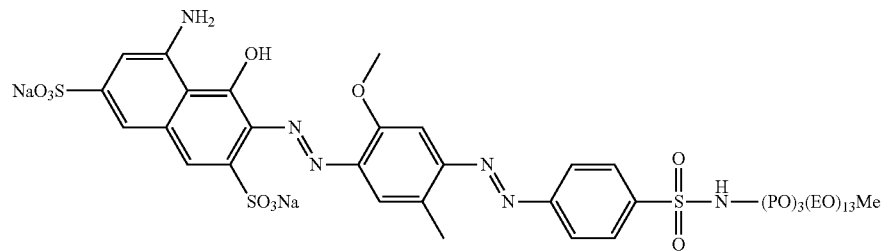

Formula BA2

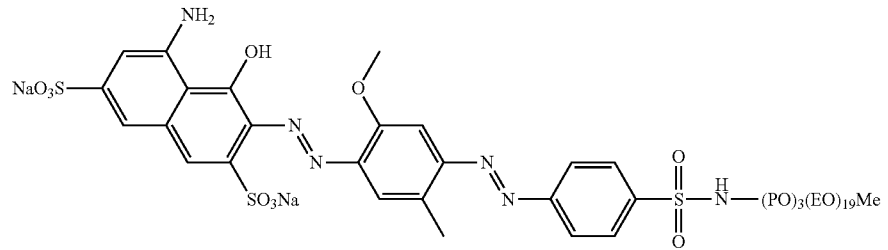

Formula BA3

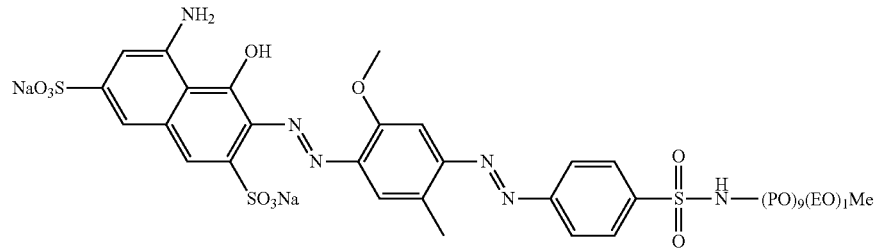

-continued
Formula BA6
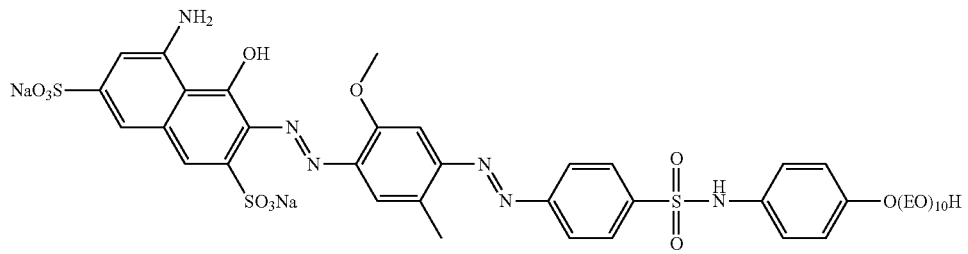
Formula BA10
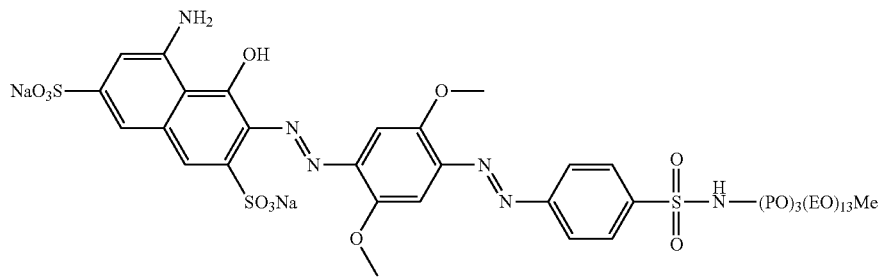
Formula BA11
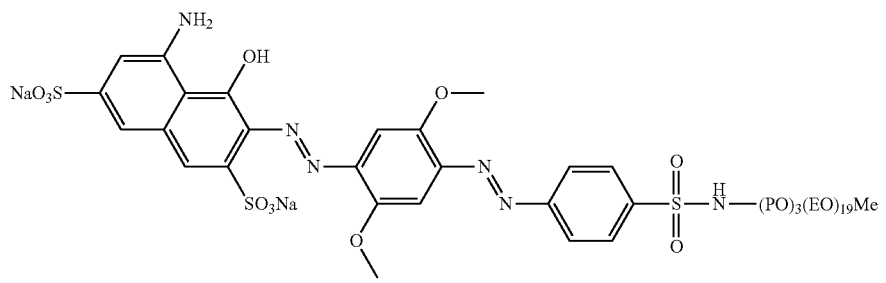
Formula BA12
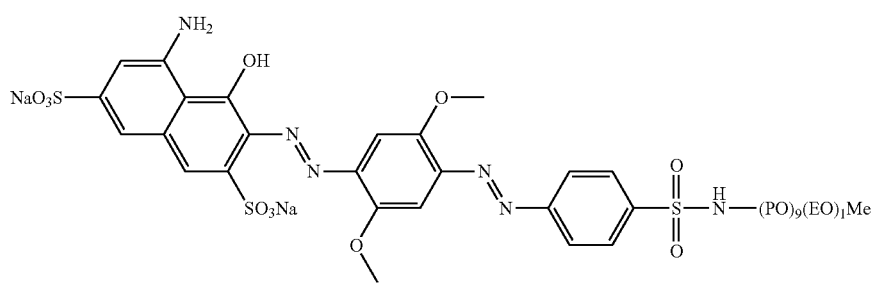
Formula BA15
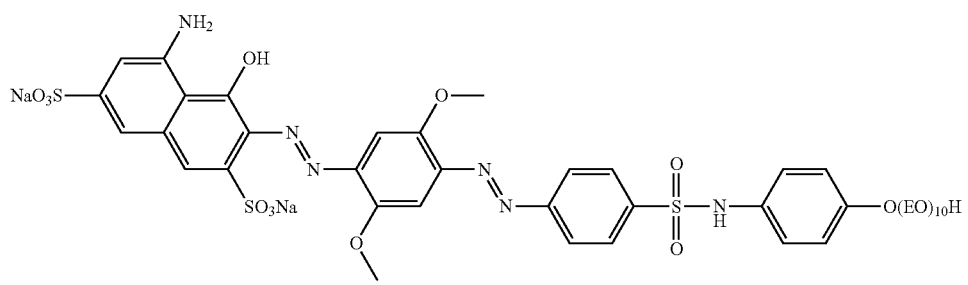
Formula BA19
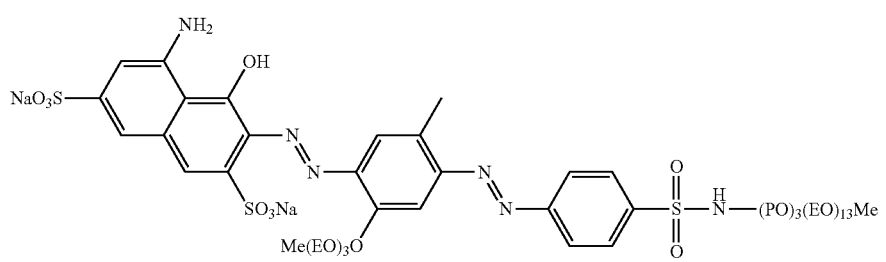

-continued
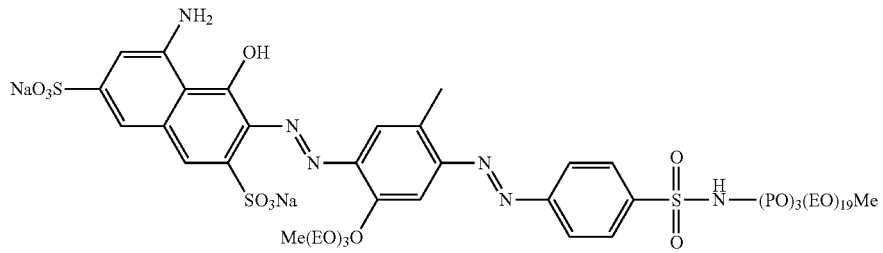
Formula BA20
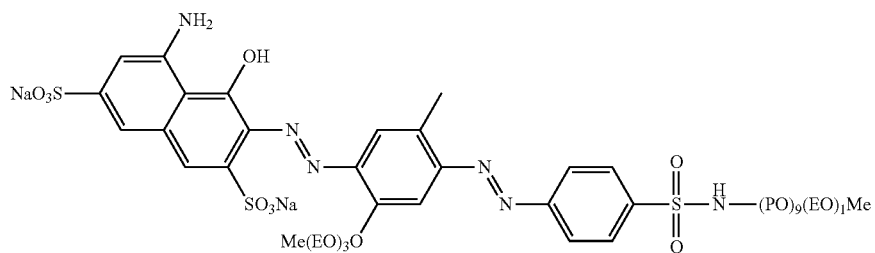
Formula BA21
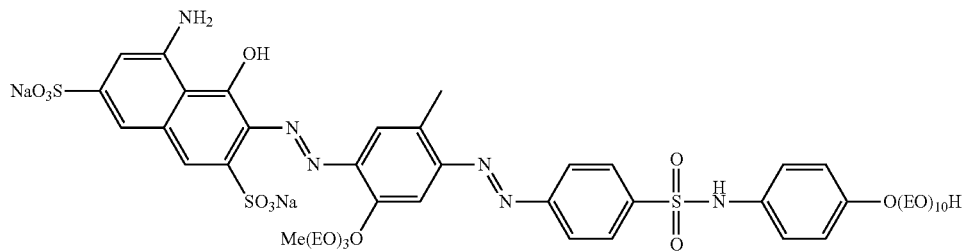
Formula BA24
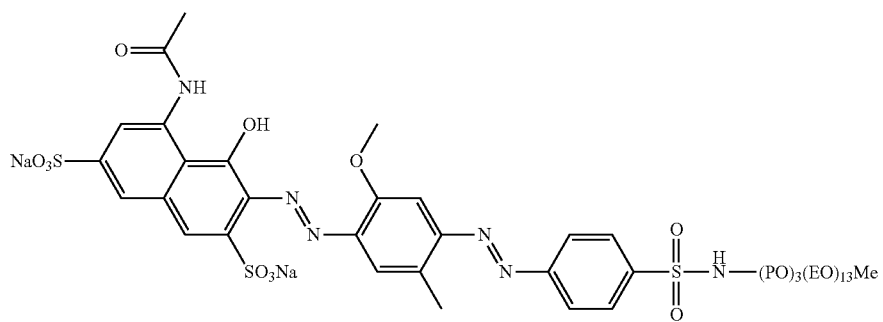
Formula BA28
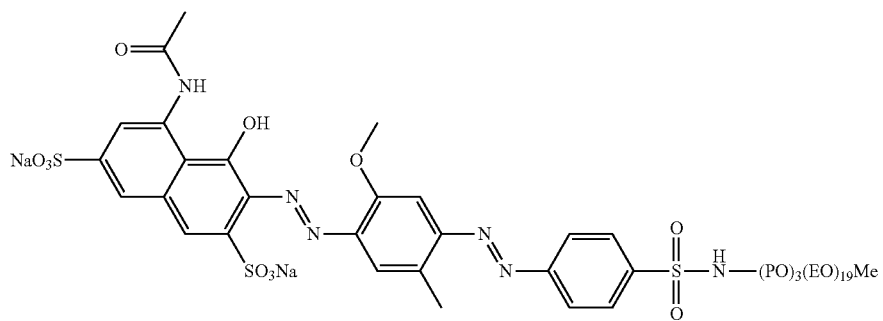
Formula BA29

-continued
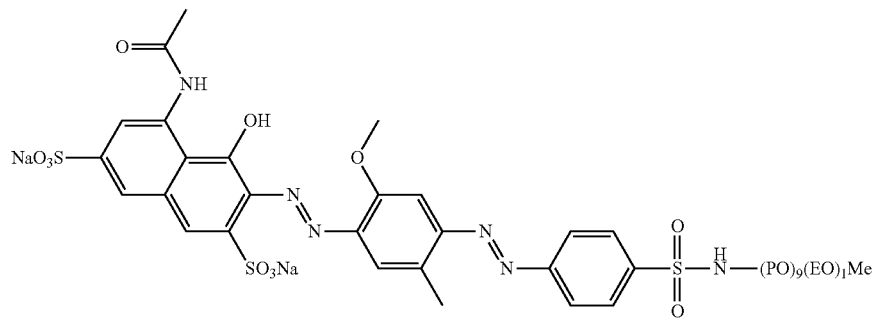
Formula BA30
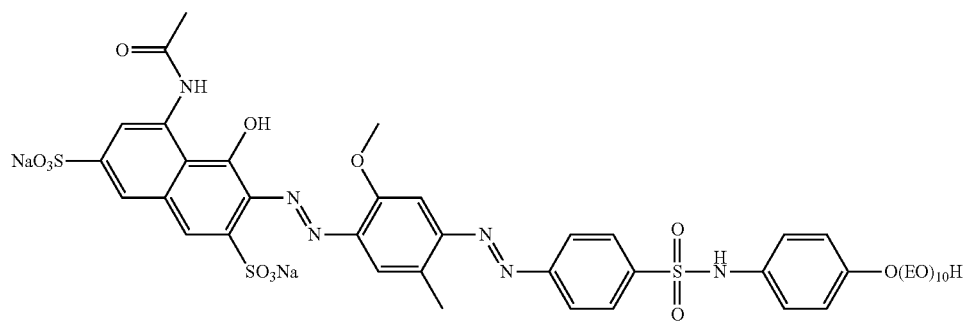
Formula BA33
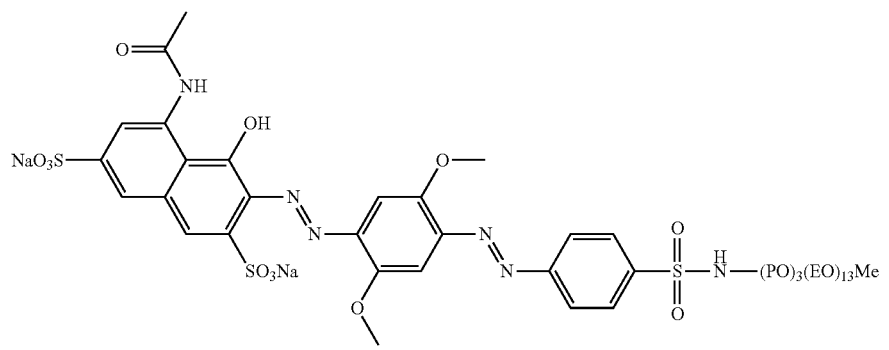
Formula BA37
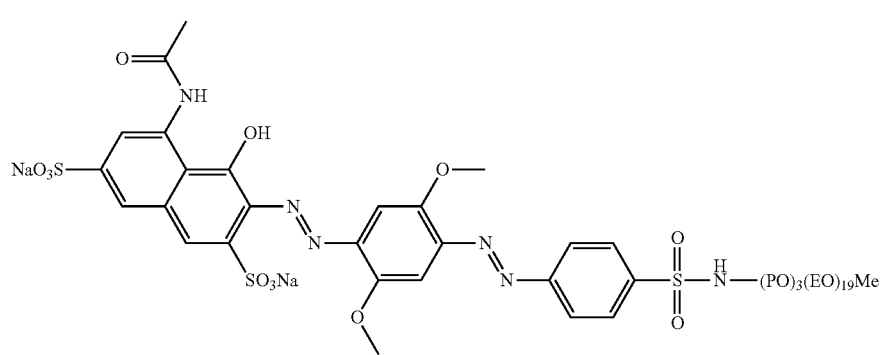
Formula BA38

-continued
Formula BA39
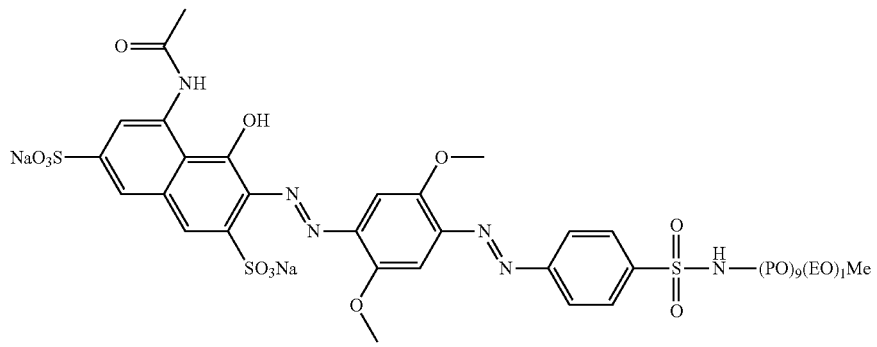
Formula BA42
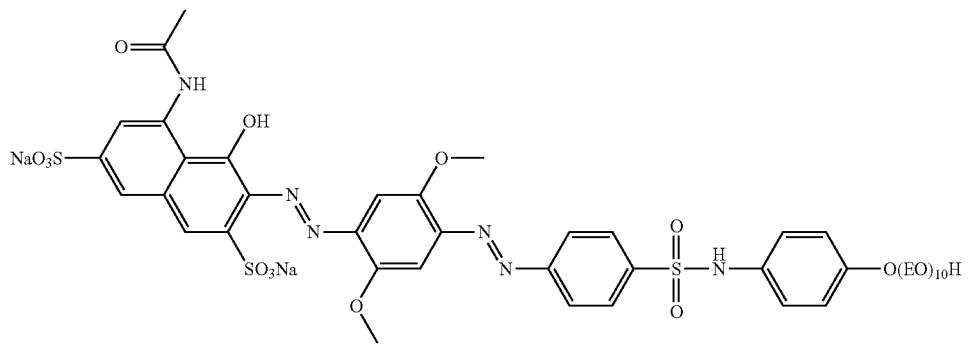
Formula BA46
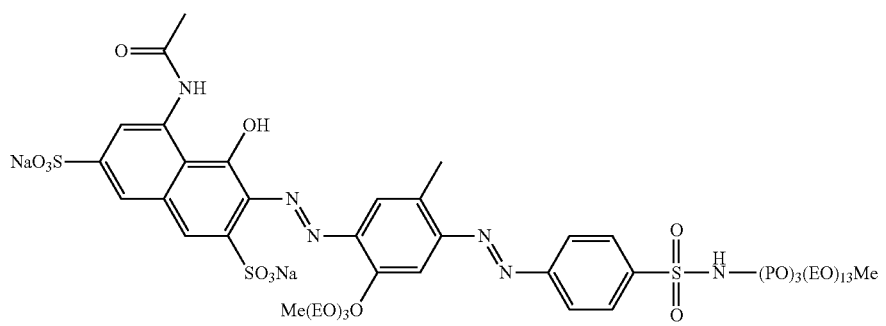
Formula BA47
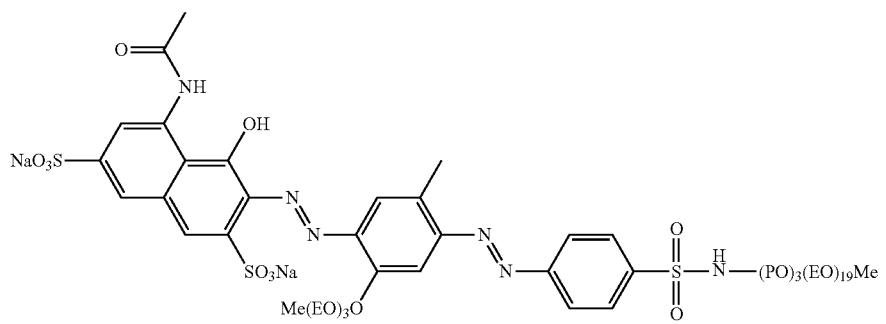

-continued
Formula BA48
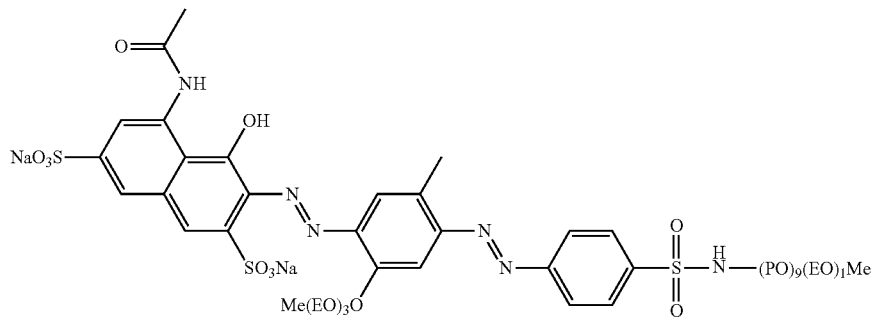
Formula BA51
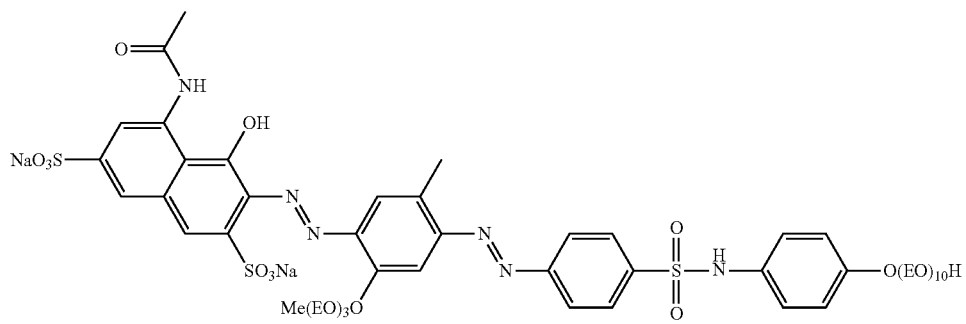
Formula BA55
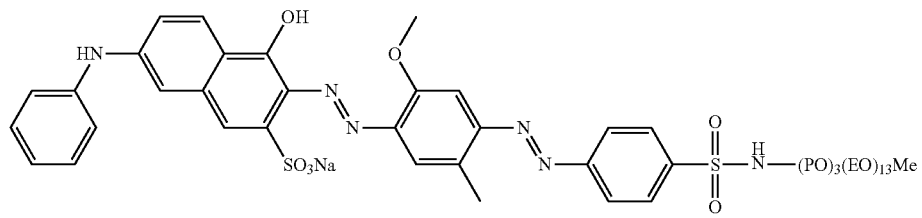
Formula BA56
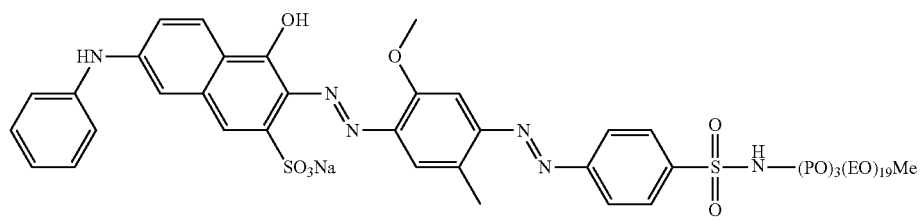
Formula BA57
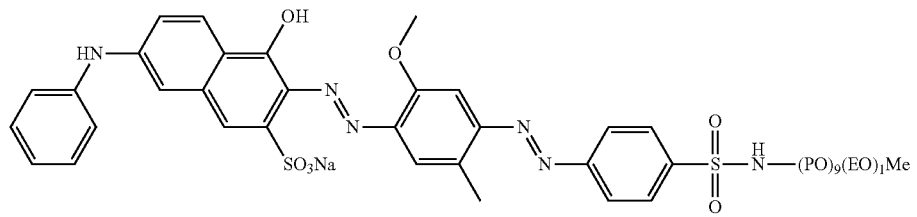
Formula BA60
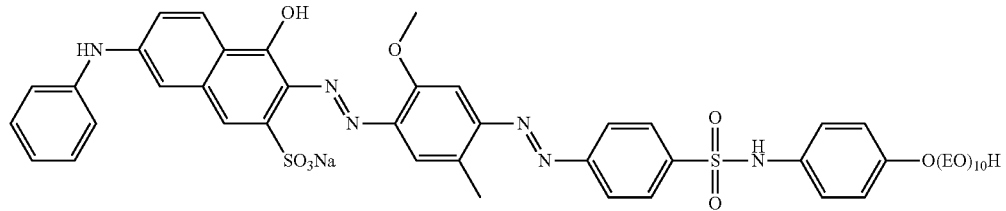

-continued
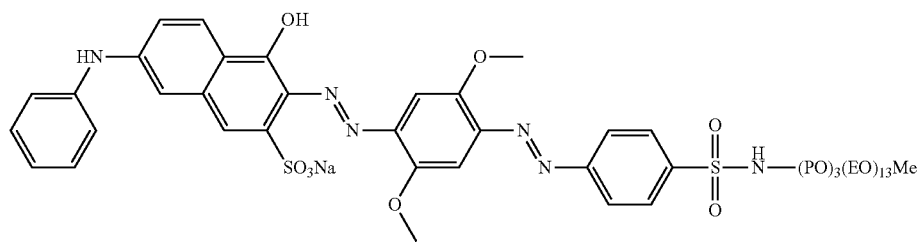
Formula BA64
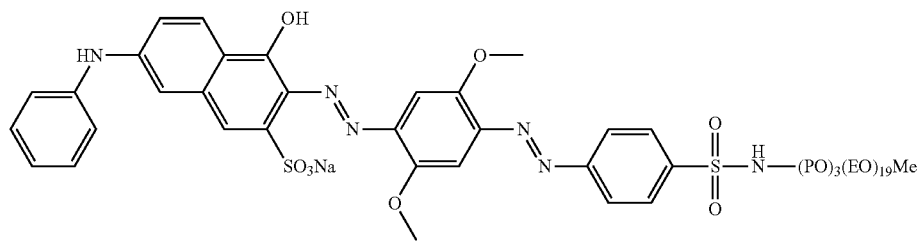
Formula BA65
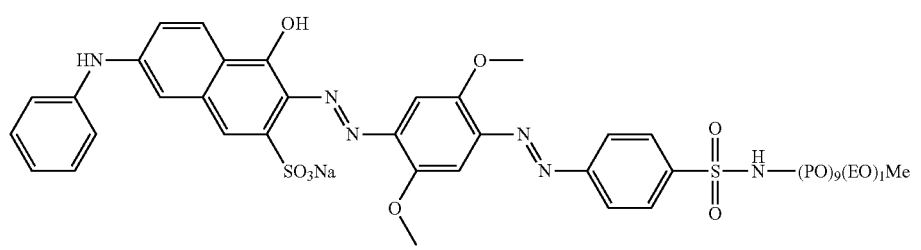
Formula BA66
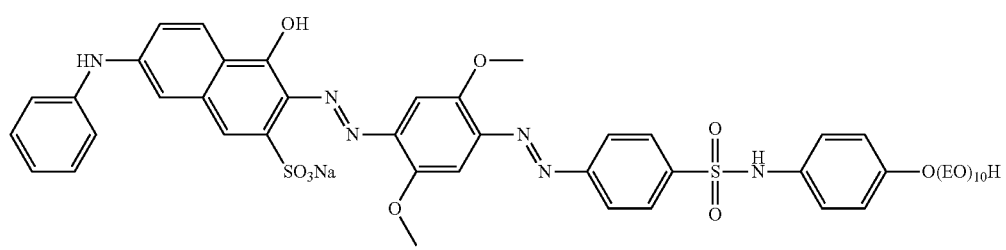
Formula BA69
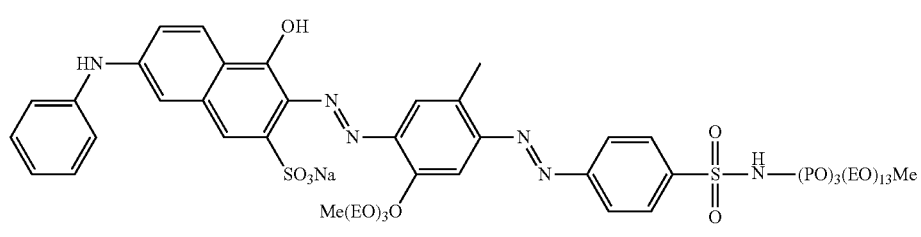
Formula BA73
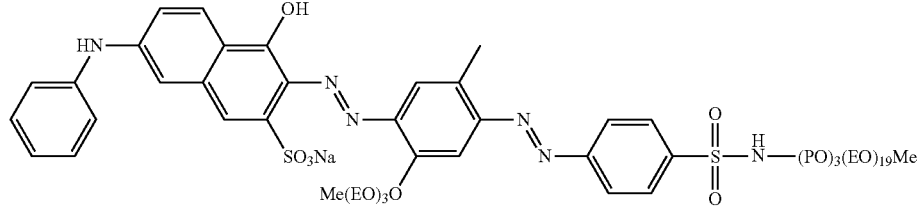
Formula BA74

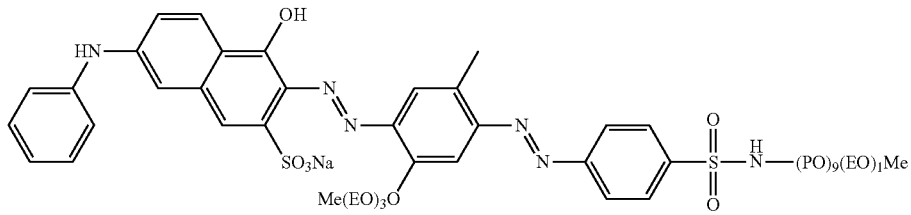

Formula BA75

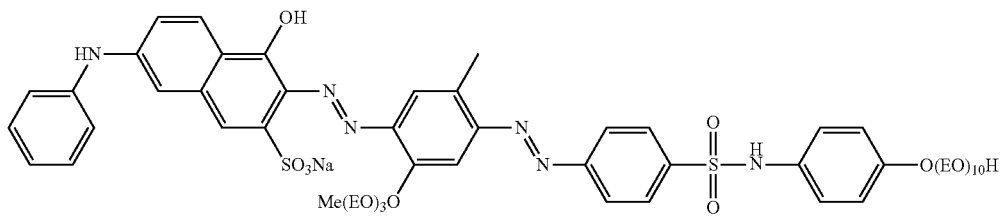

Formula BA78

Clay:

The particle is comprised of a clay carrier and a hueing dye. The particle may be comprised of a majority by weight of the carrier. Typically, the clay carrier is selected from the group consisting of: allophane clays; chlorite clays, preferred chlorite clays are amesite clays, baileychlore clays, chamosite clays, clinochlore clays, cookeite clays, corundophite clays, daphnite clays, delessite clays, gonyerite clays, nimite clays, odinite clays, orthochamosite clays, pannantite clays, penninite clays, rhipidolite clays, sudoite clays and thuringite clays; illite clays; inter-stratified clays; iron oxyhydroxide clays, preferred iron oxyhydroxide clays are hematite clays, goethite clays, lepidocrite clays and ferrihydrite clays; kaolin clays, preferred kaolin clays are kaolinite clays, halloysite clays, dickite clays, nacrite clays and hisingerite clays; smectite clays; vermiculite clays; and mixtures thereof. Other examples of clay carriers include sepiolite, alunite, hydrotalcite, attapulgite, pimelite, muscovite, willemseite, minnesotaite, antigorite, amesite, china clay, halloysite, and the like, and combinations of any of the foregoing clay carriers.

Preferably, the clay is a smectite clay. Preferred smectite clays are beidellite clays, hectorite clays, laponite clays, montmorillonite clays, nontonite clays, nontronite clays, saponite clays and mixtures thereof. Preferably, the smectite clay may be a dioctahedral smectite clay. A preferred dioctahedral smectite clay is montmorillonite clay. The montmorillonite clay may be low-charge montmorillonite clay (also known as sodium montmorillonite clay or Wyoming-type montmorillonite clay). Typically, low-charge montmorillonite clay can be represented by the formula:

$Na_xAl_{2-x}Mg_xSi_4O_{10}(OH)_2$, wherein, x is a number from 0.1 to 0.5, preferably from 0.2, and preferably to 0.4.

The montmorillonite clay may also be a high-charge montmorillonite clay (also known as a calcium montmorillonite clay or Cheto-type montmorillonite clay). Typically, high-charge montmorillonite clays can be represented by the formula:

$Ca_xAl_{2-x}Mg_xSi_4O_{10}(OH)_2$, wherein, x is a number from 0.1 to 0.5, preferably from 0.2, and preferably to 0.4.

Bentonites are clays that are comprised primarily of, and whose properties are typically dictated by a smectite clay mineral (e.g. montmorillonite, hectorite, nontronite, etc.). Smectites are generally comprised of stacks of negatively charged layers (wherein each layer is comprised of two tetrahedral sheets attached to one octahedral sheet; the tetrahedra formed by silicon and oxygen atoms and the octahedral formed by aluminum and oxygen atoms together with hydroxyl radicals) balanced and/or compensated by alkaline earth metal cations (e.g. $Ca^{2+}$ and/or $Mg^{2+}$) and/or alkali metal cations (eg. $Na^+$ and/or $K^+$). The relative amounts of the two types (alkaline earth metal and alkali metal) of cations typically determine the swelling characteristic of the clay material when placed in water. Bentonites, in which the alkaline earth metal cation $Ca^{2+}$ is predominant (or is in a relative majority), are called calcium bentonites; whereas, bentonites in which the alkali metal cation $Na^+$ is predominant (or is in a relative majority) are called sodium bentonites. A preferred clay is bentonite clay, which comprises predominantly montmorillonite clay.

The term "natural," as used herein with respect to clay material, refers to the presence of the mineral in deposits found in the earth (formed via modification of volcanic ash deposits in marine basins by geological processes). Accordingly, a natural deposit of bentonite containing primarily (or a relative majority of) $Na^+$ cations is referred to as "natural sodium bentonite;" whereas, a natural deposit of a bentonite predominantly containing (or containing a relative majority of) $Ca^{2+}$ cations is referred to as "natural calcium bentonite."

Synthetic analogues of Na and Ca bentonite may also be synthesized (by using hydrothermal techniques, for example). "Synthetic sodium bentonite" may also refer to bentonite obtained by treatment of calcium bentonite with, but not limited to, sodium carbonate or sodium oxalate (to remove the calcium ion and substitute it with a sodium ion). This treatment can be varied to impart different levels of ion-exchange or $Na^+$ for $Ca^{2+}$ substitution. Herein, these materials are referred to as "partially activated" and "fully activated" grades of clay material, respectively (with "fully" referring to maximum exchange of $Ca^{2+}$ for $Na^+$).

One of the reasons for converting calcium bentonite into synthetic sodium bentonite is to impart greater swelling properties to otherwise (relatively) non-swelling calcium bentonite. There is also an aesthetic benefit associated with synthetic sodium bentonite that is lacking in natural sodium bentonite. Natural sodium bentonite (generally, irrespective of the part of the world in which the deposit is located) is colored. The color ranges from brown to yellow to gray. By comparison, natural calcium bentonite has a more aesthetically pleasing white color. Consequently, synthetic sodium bentonite that is obtained by treatment of this white calcium bentonite is also white. As a result, natural calcium bentonite and synthetic sodium bentonite find more widespread use in the detergent industry, as compared to natural sodium bentonite.

Applicants' studies have shown differences in the propensity of certain hueing agents to stain fabrics depending on the type of bentonite clay (in the form of a colored clay speckle or colored clay powder) to which the hueing agents have been applied (natural sodium vs. natural calcium bentonite; natural sodium bentonite vs. synthetic sodium bentonite; partially vs. fully activated synthetic sodium bentonite). It has been discovered that, at equal color loading, natural sodium bentonite display lower propensity for staining than calcium bentonite. It has also been discovered that, at equal color loading, synthetic sodium bentonite exhibits lesser staining risk than calcium bentonite. However, at equal color loading, even fully activated synthetic sodium bentonite shows greater staining than natural sodium bentonite. The same observations were made independent of whether the color was applied to a bentonite speckle or a bentonite powder.

However, the appearance of a particle made from natural sodium bentonite may need to be improved, due to the yellow/gray/brown coloration of the natural sodium bentonite. The reduction in the staining risk observed by the use of natural sodium bentonite indicates that it may be possible to blend natural sodium bentonite with a whiter bentonite (such as calcium bentonite or synthetic sodium bentonite or mixtures thereof), thereby resulting in a speckle with a whiter appearance than a 100% natural Na-bentonite speckle, but with lower staining risk than 100% Ca and synthetic sodium Bentonite speckles.

In one aspect, the clay carrier exhibits a particular range of particle size, as determined, for example, by sieving techniques according to ASTM D1921-06 ("Standard Test Method For Particle Size (Sieve Analysis) of Plastic Materials"). Alternative methods known to those skilled in the art may also be utilized for determining particle size. For example, other sieving techniques may be used or electronic laboratory equipment known for determining particle size may alternatively be employed.

Commercially available examples of suitable clay carriers include Pelben® 10 and Pelben® 35 (available from Buntech, a Brazilian company). Suitable examples of clay powders include Argel® 10 and Argel® 40 (available from Buntech).

Suitable clays also include clays supplied by Amcol, Ill., United States, such as those sold under the tradenames Quest® Bentonite and Polargel® series of clay.

The clay carrier can be characterized by having a particle size such that at least 95 wt % of the clay carrier has a particle size that is in the range from 50 micrometers to 2,000 micrometers, preferably from 50 micrometers to 1,500 micrometers, or from 50 micrometers to 1,000 micrometers, or from 50 micrometers to 500 micrometers, or from 50 micrometer to 300 micrometers, or from 50 to 200. Further preferably the clay carrier can be characterized by having an average particle of 50 micrometers to 2,000 micrometers, preferably from 50 micrometers to 1,500 micrometers, or from 50 micrometers to 1,000 micrometers, or from 50 micrometers to 500 micrometers, or from 50 micrometer to 300 micrometers, or from 50 to 200. The clay preferably has a particle size such that at least 95 wt % of the clay has a particle size in the range of from 50 micrometers to 400 micrometers, preferably 50 micrometers to 300 or more preferably 100 to 250 micrometers or from 50 to 200 micrometers.

The clay may also impart fabric softness benefits during a laundering process.

Detersive Surfactant:

Suitable detersive surfactants include anionic detersive surfactants, non-ionic detersive surfactant, cationic detersive surfactants, zwitterionic detersive surfactants, amphoteric detersive surfactants, and any combination thereof.

Anionic Detersive Surfactant:

Suitable anionic detersive surfactants include sulphate and sulphonate detersive surfactants.

Suitable sulphonate detersive surfactants include alkyl benzene sulphonate, such as $C_{10-13}$ alkyl benzene sulphonate. Suitable alkyl benzene sulphonate (LAS) is obtainable, or even obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. Another suitable anionic detersive surfactant is alkyl benzene sulphonate that is obtained by DETAL catalyzed process, although other synthesis routes, such as HF, may also be suitable.

Suitable sulphate detersive surfactants include alkyl sulphate, such as $C_{8-18}$ alkyl sulphate, or predominantly $C_{1-2}$ alkyl sulphate. The alkyl sulphate may be derived from natural sources, such as coco and/or tallow. Alternative, the alkyl sulphate may be derived from synthetic sources such as $C_{12-15}$ alkyl sulphate.

Another suitable sulphate detersive surfactant is alkyl alkoxylated sulphate, such as alkyl ethoxylated sulphate, or a $C_{8-48}$ alkyl alkoxylated sulphate, or a $C_{8-48}$ alkyl ethoxylated sulphate. The alkyl alkoxylated sulphate may have an average degree of alkoxylation of from 0.5 to 20, or from 0.5 to 10. The alkyl alkoxylated sulphate may be a $C_{8-48}$ alkyl ethoxylated sulphate, typically having an average degree of ethoxylation of from 0.5 to 10, or from 0.5 to 7, or from 0.5 to 5 or from 0.5 to 3.

The alkyl sulphate, alkyl alkoxylated sulphate and alkyl benzene sulphonates may be linear or branched, substituted or un-substituted.

The anionic detersive surfactant may be a mid-chain branched anionic detersive surfactant, such as a mid-chain branched alkyl sulphate and/or a mid-chain branched alkyl benzene sulphonate.

The mid-chain branches are typically $C_{1-4}$ alkyl groups, such as methyl and/or ethyl groups.

Another suitable anionic detersive surfactant is alkyl ethoxy carboxylate.

The anionic detersive surfactants are typically present in their salt form, typically being complexed with a suitable cation. Suitable counter-ions include $Na^+$ and $K^+$, substituted ammonium such as $C_1$-$C_6$ alkanolammonium such as mono-ethanolamine (MEA) tri-ethanolamine (TEA), di-ethanolamine (DEA), and any mixture thereof.

Non-Ionic Detersive Surfactant:

Suitable non-ionic detersive surfactants are selected from the group consisting of: $C_8$-$C_{18}$ alkyl ethoxylates, such as, NEODOL® non-ionic surfactants from Shell; $C_6$-$C_{12}$ alkyl phenol alkoxylates wherein optionally the alkoxylate units are ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols; $C_{14}$-$C_{22}$ mid-chain branched alkyl alkoxylates, typically having an average degree of alkoxylation of from 1 to 30; alkylpolysaccharides, such as alkylpolyglycosides; polyhydroxy fatty acid amides; ether capped poly(oxyalkylated) alcohol surfactants; and mixtures thereof.

Suitable non-ionic detersive surfactants are alkyl polyglucoside and/or an alkyl alkoxylated alcohol.

Suitable non-ionic detersive surfactants include alkyl alkoxylated alcohols, such as $C_{8-18}$ alkyl alkoxylated alcohol, or a $C_{8-18}$ alkyl ethoxylated alcohol. The alkyl alkoxylated alcohol may have an average degree of alkoxylation of from 0.5 to 50, or from 1 to 30, or from 1 to 20, or from 1 to 10. The alkyl alkoxylated alcohol may be a $C_{8-18}$ alkyl ethoxylated alcohol, typically having an average degree of ethoxylation of from 1 to 10, or from 1 to 7, or from 1 to 5, or from 3 to 7. The alkyl alkoxylated alcohol can be linear or branched, and substituted or un-substituted.

Suitable nonionic detersive surfactants include secondary alcohol-based detersive surfactants having the formula:

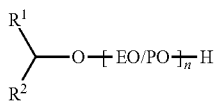

wherein $R^1$=linear or branched, substituted or unsubstituted, saturated or unsaturated $C_{2-8}$ alkyl;
wherein $R^2$=linear or branched, substituted or unsubstituted, saturated or unsaturated $C_{2-8}$ alkyl,
wherein the total number of carbon atoms present in $R^1+R^2$ moieties is in the range of from 7 to 13;
wherein EO/PO are alkoxy moieties selected from ethoxy, propoxy, or mixtures thereof, optionally the EO/PO alkoxyl moieties are in random or block configuration;
wherein n is the average degree of alkoxylation and is in the range of from 4 to 10.

Other suitable non-ionic detersive surfactants include EO/PO block co-polymer surfactants, such as the Plurafac® series of surfactants available from BASF, and sugar-derived surfactants such as alkyl N-methyl glucose amide.

Cationic Detersive Surfactant:

Suitable cationic detersive surfactants include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula:

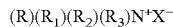

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, suitable anions include: halides, such as chloride; sulphate; and sulphonate. Suitable cationic detersive surfactants are mono-$C_{6-18}$ alkyl mono-hydroxyethyl di-methyl quaternary ammonium chlorides. Suitable cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Zwitterionic and/or Amphoteric Detersive Surfactant:

Suitable zwitterionic and/or amphoteric detersive surfactants include amine oxide such as dodecyldimethylamine N-oxide, alkanolamine sulphobetaines, coco-amidopropyl betaines, $HN^+$—R—$CO_2^-$ based surfactants, wherein R can be any bridging group, such as alkyl, alkoxy, aryl or amino acids.

Polymer:

Suitable polymers include carboxylate polymers, polyethylene glycol polymers, polyester soil release polymers such as terephthalate polymers, amine polymers, cellulosic polymers, dye transfer inhibition polymers, dye lock polymers such as a condensation oligomer produced by condensation of imidazole and epichlorhydrin, optionally in ratio of 1:4:1, hexamethylenediamine derivative polymers, and any combination thereof.

Carboxylate Polymer:

Suitable carboxylate polymers include maleate/acrylate random copolymer or polyacrylate homopolymer. The carboxylate polymer may be a polyacrylate homopolymer having a molecular weight of from 4,000 Da to 9,000 Da, or from 6,000 Da to 9,000 Da. Other suitable carboxylate polymers are co-polymers of maleic acid and acrylic acid, and may have a molecular weight in the range of from 4,000 Da to 90,000 Da.

Other suitable carboxylate polymers are co-polymers comprising: (i) from 50 to less than 98 wt % structural units derived from one or more monomers comprising carboxyl groups; (ii) from 1 to less than 49 wt % structural units derived from one or more monomers comprising sulfonate moieties; and (iii) from 1 to 49 wt % structural units derived from one or more types of monomers selected from ether bond-containing monomers represented by formulas (I) and (II):

Formula (I):

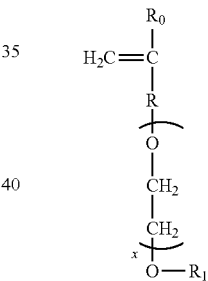

wherein in formula (I), $R_0$ represents a hydrogen atom or $CH_3$ group, R represents a $CH_2$ group, $CH_2CH_2$ group or single bond, X represents a number 0-5 provided X represents a number 1-5 when R is a single bond, and $R_1$ is a hydrogen atom or $C_1$ to $C_{20}$ organic group;

Formula (II)

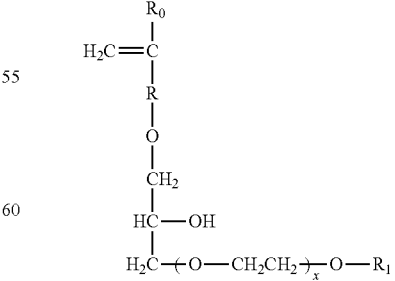

in formula (II), $R_0$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group.

Polyethylene Glycol Polymer:

Suitable polyethylene glycol polymers include random graft co-polymers comprising: (i) hydrophilic backbone comprising polyethylene glycol; and (ii) hydrophobic side chain(s) selected from the group consisting of: $C_4$-$C_{25}$ alkyl group, polypropylene, polybutylene, vinyl ester of a saturated $C_1$-$C_6$ mono-carboxylic acid, $C_1$-$C_6$ alkyl ester of acrylic or methacrylic acid, and mixtures thereof. Suitable polyethylene glycol polymers have a polyethylene glycol backbone with random grafted polyvinyl acetate side chains. The average molecular weight of the polyethylene glycol backbone can be in the range of from 2,000 Da to 20,000 Da, or from 4,000 Da to 8,000 Da. The molecular weight ratio of the polyethylene glycol backbone to the polyvinyl acetate side chains can be in the range of from 1:1 to 1:5, or from 1:1.2 to 1:2. The average number of graft sites per ethylene oxide units can be less than 1, or less than 0.8, the average number of graft sites per ethylene oxide units can be in the range of from 0.5 to 0.9, or the average number of graft sites per ethylene oxide units can be in the range of from 0.1 to 0.5, or from 0.2 to 0.4. A suitable polyethylene glycol polymer is Sokalan HP22.

Polyester Soil Release Polymers:

Suitable polyester soil release polymers have a structure as defined by one of the following structures (I), (II) or (III):

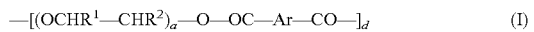

—[(OCHR$^1$—CHR$^2$)$_a$—O—OC—Ar—CO—]$_d$     (I)

—[(OCHR$^3$—CHR$^4$)$_b$—O—OC-sAr—CO—]$_e$     (II)

—[(OCHR$^5$—CHR$^6$)$_c$—OR$^7$]$_f$     (III)

wherein:
a, b and c are from 1 to 200;
d, e and f are from 1 to 50;
Ar is a 1,4-substituted phenylene;
sAr is 1,3-substituted phenylene substituted in position 5 with SO$_3$Me;
Me is H, Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or any mixture thereof;
R$^1$, R$^2$, R$^3$, R$^4$, R$^5$ and R$^6$ are independently selected from H or $C_1$-$C_{18}$ n- or iso-alkyl; and
R$^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group. Suitable polyester soil release polymers are terephthalate polymers having the structure of formula (I) or (II) above.

Suitable polyester soil release polymers include the Repel-o-tex series of polymers such as Repel-o-tex SF2 (Rhodia) and/or the Texcare series of polymers such as Texcare SRA300 (Clariant).

Amine Polymer:

Suitable amine polymers include polyethylene imine polymers, such as alkoxylated polyalkyleneimines, optionally comprising a polyethylene and/or polypropylene oxide block.

Cellulosic Polymer:

The composition can comprise cellulosic polymers, such as polymers selected from alkyl cellulose, alkyl alkoxyalkyl cellulose, carboxyalkyl cellulose, alkyl carboxyalkyl, and any combination thereof. Suitable cellulosic polymers are selected from carboxymethyl cellulose, methyl cellulose, methyl hydroxyethyl cellulose, methyl carboxymethyl cellulose, and mixtures thereof. The carboxymethyl cellulose can have a degree of carboxymethyl substitution from 0.5 to 0.9 and a molecular weight from 100,000 Da to 300,000 Da. Another suitable cellulosic polymer is hydrophobically modified carboxymethyl cellulose, such as Finnfix SH-1 (CP Kelco).

Other suitable cellulosic polymers may have a degree of substitution (DS) of from 0.01 to 0.99 and a degree of blockiness (DB) such that either DS+DB is of at least 1.00 or DB+2DS−DS$^2$ is at least 1.20. The substituted cellulosic polymer can have a degree of substitution (DS) of at least 0.55. The substituted cellulosic polymer can have a degree of blockiness (DB) of at least 0.35. The substituted cellulosic polymer can have a DS+DB, of from 1.05 to 2.00. A suitable substituted cellulosic polymer is carboxymethylcellulose.

Another suitable cellulosic polymer is cationically modified hydroxyethyl cellulose.

Dye Transfer Inhibitor Polymer:

Suitable dye transfer inhibitor (DTI) polymers include polyvinyl pyrrolidone (PVP), vinyl co-polymers of pyrrolidone and imidazoline (PVPVI), polyvinyl N-oxide (PVNO), and any mixture thereof.

Hexamethylenediamine Derivative Polymers:

Suitable polymers include hexamethylenediamine derivative polymers, typically having the formula:

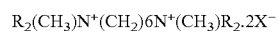

R$_2$(CH$_3$)N$^+$(CH$_2$)6N$^+$(CH$_3$)R$_2$.2X$^-$ wherein X$^-$ is a suitable counter-ion, for example chloride, and R is a poly(ethylene glycol) chain having an average degree of ethoxylation of from 20 to 30. Optionally, the poly(ethylene glycol) chains may be independently capped with sulphate and/or sulphonate groups, typically with the charge being balanced by reducing the number of X$^-$ counter-ions, or (in cases where the average degree of sulphation per molecule is greater than two), introduction of Y$^+$ counter-ions, for example sodium cations.

Builder:

Suitable builders include zeolites, phosphates, citrates, and any combination thereof.

Zeolite Builder:

The composition may be substantially free of zeolite builder. Substantially free of zeolite builder typically means comprises from 0 wt % to 10 wt %, zeolite builder, or to 8 wt %, or to 6 wt %, or to 4 wt %, or to 3 wt %, or to 2 wt %, or even to 1 wt % zeolite builder. Substantially free of zeolite builder preferably means "no deliberately added" zeolite builder. Typical zeolite builders include zeolite A, zeolite P, zeolite MAP, zeolite X and zeolite Y.

Phosphate Builder:

The composition may be substantially free of phosphate builder. Substantially free of phosphate builder typically means comprises from 0 wt % to 10 wt % phosphate builder, or to 8 wt %, or to 6 wt %, or to 4 wt %, or to 3 wt %, or to 2 wt %, or even to 1 wt % phosphate builder. Substantially free of zeolite builder preferably means "no deliberately added" phosphate builder. A typical phosphate builder is sodium tri-polyphosphate (STPP).

Citrate:

A suitable citrate is sodium citrate. However, citric acid may also be incorporated into the composition, which can form citrate in the wash liquor.

Buffer and Alkalinity Source:

Suitable buffers and alkalinity sources include carbonate salts and/or silicate salts and/or double salts such as burkeitte.

Carbonate Salt:

A suitable carbonate salt is sodium carbonate and/or sodium bicarbonate. The composition may comprise bicarbonate salt. It may be suitable for the composition to comprise low levels of carbonate salt, for example, it may be suitable for the composition to comprise from 0 wt % to 10 wt % carbonate salt, or to 8 wt %, or to 6 wt %, or to 4 wt %, or to 3 wt %, or to 2 wt %, or even to 1 wt % carbonate salt. The composition may even be substantially free of carbonate salt; substantially free means "no deliberately added".

The carbonate salt may have a weight average mean particle size of from 100 to 500 micrometers. Alternatively, the carbonate salt may have a weight average mean particle size of from 10 to 25 micrometers.

Silicate Salt:

The composition may comprise from 0 wt % to 20 wt % silicate salt, or to 15 wt %, or to 10 wt %, or to 5 wt %, or to 4 wt %, or even to 2 wt %, and may comprise from above 0 wt %, or from 0.5 wt %, or even from 1 wt % silicate salt. The silicate can be crystalline or amorphous. Suitable crystalline silicates include crystalline layered silicate, such as SKS-6. Other suitable silicates include 1.6R silicate and/or 2.0R silicate. A suitable silicate salt is sodium silicate. Another suitable silicate salt is sodium metasilicate.

Filler:

The composition may comprise from 0 wt % to 70% filler. Suitable fillers include sulphate salts and/or bio-filler materials.

Sulphate Salt:

A suitable sulphate salt is sodium sulphate. The sulphate salt may have a weight average mean particle size of from 100 to 500 micrometers, alternatively, the sulphate salt may have a weight average mean particle size of from 10 to 45 micrometers.

Bio-Filler Material:

A suitable bio-filler material is alkali and/or bleach treated agricultural waste.

Bleach:

The composition may comprise bleach. Alternatively, the composition may be substantially free of bleach; substantially free means "no deliberately added". Suitable bleach includes bleach activators, sources of available oxygen, pre-formed peracids, bleach catalysts, reducing bleach, and any combination thereof. If present, the bleach, or any component thereof, for example the pre-formed peracid, may be coated, such as encapsulated, or clathrated, such as with urea or cyclodextrin.

Bleach Activator:

Suitable bleach activators include: tetraacetylethylenediamine (TAED); oxybenzene sulphonates such as nonanoyl oxybenzene sulphonate (NOBS), caprylamidononanoyl oxybenzene sulphonate (NACA-OBS), 3,5,5-trimethyl hexanoyloxybenzene sulphonate (Iso-NOBS), dodecyl oxybenzene sulphonate (LOBS), and any mixture thereof; caprolactams; pentaacetate glucose (PAG); nitrile quaternary ammonium; imide bleach activators, such as N-nonanoyl-N-methyl acetamide; and any mixture thereof.

Source of Available Oxygen:

A suitable source of available oxygen (AvOx) is a source of hydrogen peroxide, such as percarbonate salts and/or perborate salts, such as sodium percarbonate. The source of peroxygen may be at least partially coated, or even completely coated, by a coating ingredient such as a carbonate salt, a sulphate salt, a silicate salt, borosilicate, or any mixture thereof, including mixed salts thereof. Suitable percarbonate salts can be prepared by a fluid bed process or by a crystallization process. Suitable perborate salts include sodium perborate mono-hydrate (PB1), sodium perborate tetra-hydrate (PB4), and anhydrous sodium perborate which is also known as fizzing sodium perborate. Other suitable sources of AvOx include persulphate, such as oxone. Another suitable source of AvOx is hydrogen peroxide.

Pre-Formed Peracid:

A suitable pre-formed peracid is N,N-pthaloylamino peroxycaproic acid (PAP).

Bleach Catalyst:

Suitable bleach catalysts include oxaziridinium-based bleach catalysts, transition metal bleach catalysts and bleaching enzymes.

Oxaziridinium-Based Bleach Catalyst:

A suitable oxaziridinium-based bleach catalyst has the formula:

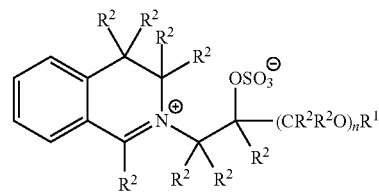

wherein: $R^1$ is selected from the group consisting of: H, a branched alkyl group containing from 3 to 24 carbons, and a linear alkyl group containing from 1 to 24 carbons; $R^1$ can be a branched alkyl group comprising from 6 to 18 carbons, or a linear alkyl group comprising from 5 to 18 carbons, $R^1$ can be selected from the group consisting of: 2-propylheptyl, 2-butyloctyl, 2-pentylnonyl, 2-hexyldecyl, n-hexyl, n-octyl, n-decyl, n-dodecyl, n-tetradecyl, n-hexadecyl, n-octadecyl, iso-nonyl, iso-decyl, iso-tridecyl and iso-pentadecyl; $R^2$ is independently selected from the group consisting of: H, a branched alkyl group comprising from 3 to 12 carbons, and a linear alkyl group comprising from 1 to 12 carbons; optionally $R^2$ is independently selected from H and methyl groups; and n is an integer from 0 to 1.

Transition Metal Bleach Catalyst:

The composition may include transition metal bleach catalyst, typically comprising copper, iron, titanium, ruthenium, tungsten, molybdenum, and/or manganese cations. Suitable transition metal bleach catalysts are manganese-based transition metal bleach catalysts.

Reducing Bleach:

The composition may comprise a reducing bleach. However, the composition may be substantially free of reducing bleach; substantially free means "no deliberately added". Suitable reducing bleach include sodium sulphite and/or thiourea dioxide (TDO).

Co-Bleach Particle:

The composition may comprise a co-bleach particle. Typically, the co-bleach particle comprises a bleach activator and a source of peroxide. It may be highly suitable for a large amount of bleach activator relative to the source of hydrogen peroxide to be present in the co-bleach particle. The weight ratio of bleach activator to source of hydrogen peroxide present in the co-bleach particle can be at least 0.3:1, or at least 0.6:1, or at least 0.7:1, or at least 0.8:1, or at least 0.9:1, or at least 1.0:1.0, or even at least 1.2:1 or higher.

The co-bleach particle can comprise: (i) bleach activator, such as TAED; and (ii) a source of hydrogen peroxide, such as sodium percarbonate. The bleach activator may at least partially, or even completely, enclose the source of hydrogen peroxide.

The co-bleach particle may comprise a binder. Suitable binders are carboxylate polymers such as polyacrylate polymers, and/or surfactants including non-ionic detersive surfactants and/or anionic detersive surfactants such as linear $C_{11}$-$C_{13}$ alkyl benzene sulphonate.

The co-bleach particle may comprise bleach catalyst, such as an oxaziridium-based bleach catalyst.

Chelant:

Suitable chelants are selected from: diethylene triamine pentaacetate, diethylene triamine penta(methyl phosphonic acid), ethylene diamine-N'N'-disuccinic acid, ethylene diamine tetraacetate, ethylene diamine tetra(methylene phosphonic acid), hydroxyethane di(methylene phosphonic acid), and any combination thereof. A suitable chelant is ethylene diamine-N'N'-disuccinic acid (EDDS) and/or hydroxyethane diphosphonic acid (HEDP). The laundry detergent composition may comprise ethylene diamine-N'N'-disuccinic acid or salt thereof. The ethylene diamine-N'N'-disuccinic acid may be in S,S enantiomeric form. The composition may comprise 4,5-dihydroxy-m-benzenedisulfonic acid disodium salt. Suitable chelants may also be calcium crystal growth inhibitors.

Calcium Carbonate Crystal Growth Inhibitor:

The composition may comprise a calcium carbonate crystal growth inhibitor, such as one selected from the group consisting of: 1-hydroxyethanediphosphonic acid (HEDP) and salts thereof; N,N-dicarboxymethyl-2-aminopentane-1, 5-dioic acid and salts thereof; 2-phosphonobutane-1,2,4-tricarboxylic acid and salts thereof; and any combination thereof.

Photobleach:

Suitable photobleaches are zinc and/or aluminium sulphonated phthalocyanines.

Hueing Agent:

In addition to the hueing dye required by the present invention, other hueing agents may also be used in combination with the hueing dye described in more detail above to deposit onto fabrics from the wash liquor so as to improve fabric whiteness perception, for example producing a relative hue angle of from 200° to 320° on a garment. The hueing agent is typically blue or violet. It may be suitable that the hueing dye(s) have a peak absorption wavelength of from 550 nm to 650 nm, or from 570 nm to 630 nm. The hueing agent may be a combination of dyes which together have the visual effect on the human eye as a single dye having a peak absorption wavelength on polyester of from 550 nm to 650 nm, or from 570 nm to 630 nm. This may be provided for example by mixing a red and green-blue dye to yield a blue or violet shade.

Dyes are typically coloured organic molecules which are soluble in aqueous media that contain surfactants. Dyes maybe selected from the classes of basic, acid, hydrophobic, direct and polymeric dyes, and dye-conjugates. Suitable polymeric hueing dyes are commercially available, for example from Milliken, Spartanburg, S.C., USA.

Examples of suitable dyes are, direct violet 7, direct violet 9, direct violet 11, direct violet 26, direct violet 31, direct violet 35, direct violet 40, direct violet 41, direct violet 51, direct violet 66, direct violet 99, acid violet 50, acid blue 9, acid violet 17, acid black 1, acid red 17, acid blue 29, acid blue 80 solvent violet 13, disperse violet 27 disperse violet 26, disperse violet 28, disperse violet 63 and disperse violet 77, basic blue 16, basic blue 65, basic blue 66, basic blue 67, basic blue 71, basic blue 159, basic violet 19, basic violet 35, basic violet 38, basic violet 48; basic blue 3, basic blue 75, basic blue 95, basic blue 122, basic blue 124, basic blue 141, thiazolium dyes, reactive blue 19, reactive blue 163, reactive blue 182, reactive blue 96, Liquitint® Violet CT (Milliken, Spartanburg, USA), Liquitint® Violet DD (Milliken, Spartanburg, USA) and Azo-CM-Cellulose (Megazyme, Bray, Republic of Ireland). Other suitable hueing agents are hueing dye-photobleach conjugates, such as those described in Ref WO 09/069,077. A particularly suitable hueing agent is a combination of acid red 52 and acid blue 80, or the combination of direct violet 9 and solvent violet 13.

Brightener:

Suitable brighteners are stilbenes, such as C.I. Fluorescent Brightener 351 or C.I. Fluorescent Brightener 260. The brightener may be in micronized particulate form, having a weight average particle size in the range of from 3 to 30 micrometers, or from 3 micrometers to 20 micrometers, or from 3 to 10 micrometers. The brightener can be alpha or beta crystalline form.

Enzyme:

Suitable enzymes include proteases, amylases, cellulases, lipases, xyloguncanases, pectate lyases, mannanases, bleaching enzymes, cutinases, and mixtures thereof.

For the enzymes, accession numbers and IDs shown in parentheses refer to the entry numbers in the databases Genbank, EMBL and/or Swiss-Prot. For any mutations, standard 1-letter amino acid codes are used with a * representing a deletion. Accession numbers prefixed with DSM refer to micro-organisms deposited at Deutsche Sammlung von Mikroorganismen and Zellkulturen GmbH, Mascheroder Weg 1b, 38124 Brunswick (DSMZ).

Protease.

The composition may comprise a protease. Suitable proteases include metalloproteases and/or serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus, Bacillus alkalophilus* (P27963, ELYA_BACAO), *Bacillus subtilis, Bacillus amyloliquefaciens* (P00782, SUBT_BACAM), *Bacillus pumilus* (P07518) and *Bacillus gibsonii* (DSM14391).

(b) trypsin-type or chymotrypsin-type proteases, such as trypsin (e.g. of porcine or bovine origin), including the *Fusarium* protease and the chymotrypsin proteases derived from *Cellumonas* (A2RQE2).

(c) metalloproteases, including those derived from *Bacillus amyloliquefaciens* (P06832, NPRE_BACAM).

Suitable proteases include those derived from *Bacillus gibsonii* or *Bacillus Lentus* such as subtilisin 309 (P29600) and/or DSM 5483 (P29599).

Suitable commercially available protease enzymes include: those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark); those sold under the tradename Maxatase®, Maxacal®, Maxapem®, Properase®, Purafect®, Purafect Prime®, Purafect Ox®, FN3®, FN4®, Excellase® and Purafect OXP® by Genencor International; those sold under the tradename Opticlean® and Optimase® by Solvay Enzymes; those available from Henkel/Kemira, namely BLAP (P29599 having the following mutations S99D+S101 R+S103A+V104I+G159S), and variants thereof including BLAP R (BLAP with S3T+V4I+V199M+

V205I+L217D), BLAP X (BLAP with S3T+V4I+V205I) and BLAP F49 (BLAP with S3T+V4I+A194P+V199M+V205I+L217D) all from Henkel/Kemira; and KAP (*Bacillus alkalophilus* subtilisin with mutations A230V+S256G+S259N) from Kao.

Amylase:

Suitable amylases are alpha-amylases, including those of bacterial or fungal origin. Chemically or genetically modified mutants (variants) are included. A suitable alkaline alpha-amylase is derived from a strain of *Bacillus*, such as *Bacillus licheniformis*, *Bacillus amyloliquefaciens*, *Bacillus stearothermophilus*, *Bacillus subtilis*, or other *Bacillus* sp., such as *Bacillus* sp. NCIB 12289, NCIB 12512, NCIB 12513, sp 707, DSM 9375, DSM 12368, DSMZ no. 12649, KSM AP1378, KSM K36 or KSM K38. Suitable amylases include:

(a) alpha-amylase derived from *Bacillus licheniformis* (P06278, AMY_BACLI), and variants thereof, especially the variants with substitutions in one or more of the following positions: 15, 23, 105, 106, 124, 128, 133, 154, 156, 181, 188, 190, 197, 202, 208, 209, 243, 264, 304, 305, 391, 408, and 444.

(b) AA560 amylase (CBU30457, HD066534) and variants thereof, especially the variants with one or more substitutions in the following positions: 26, 30, 33, 82, 37, 106, 118, 128, 133, 149, 150, 160, 178, 182, 186, 193, 203, 214, 231, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, optionally that also contain the deletions of D183* and G184*.

(c) variants exhibiting at least 90% identity with the wild-type enzyme from *Bacillus* SP722 (CBU30453, HD066526), especially variants with deletions in the 183 and 184 positions.

Suitable commercially available alpha-amylases are Duramyl®, Liquezyme® Termamyl®, Termamyl Ultra®, Natalase®, Supramyl®, Stainzyme®, Stainzyme Plus®, Fungamyl® and BAN® (Novozymes A/S), Bioamylase® and variants thereof (Biocon India Ltd.), Kemzym® AT 9000 (Biozym Ges. m.b.H, Austria), Rapidase®, Purastar®, Optisize HT Plus®, Enzysize®, Powerase® and Purastar Oxam®, Maxamyl® (Genencor International Inc.) and KAM® (KAO, Japan). Suitable amylases are Natalase®, Stainzyme® and Stainzyme Plus®.

Cellulase:

The composition may comprise a cellulase. Suitable cellulases include those of bacterial or fungal origin. Chemically modified or protein engineered mutants are included. Suitable cellulases include cellulases from the genera *Bacillus*, *Pseudomonas*, *Humicola*, *Fusarium*, *Thielavia*, *Acremonium*, e.g., the fungal cellulases produced from *Humicola insolens*, *Myceliophthora thermophila* and *Fusarium oxysporum*.

Commercially available cellulases include Celluzyme®, and Carezyme® (Novozymes A/S), Clazinase®, and Puradax HA® (Genencor International Inc.), and KAC-500 (B)® (Kao Corporation).

The cellulase can include microbial-derived endoglucanases exhibiting endo-beta-1,4-glucanase activity (E.C. 3.2.1.4), including a bacterial polypeptide endogenous to a member of the genus *Bacillus* sp. AA349 and mixtures thereof. Suitable endoglucanases are sold under the tradenames Celluclean® and Whitezyme® (Novozymes A/S, Bagsvaerd, Denmark).

The composition may comprise a cleaning cellulase belonging to Glycosyl Hydrolase family 45 having a molecular weight of from 17 kDa to 30 kDa, for example the endoglucanases sold under the tradename Biotouch® NCD, DCC and DCL (AB Enzymes, Darmstadt, Germany).

Suitable cellulases may also exhibit xyloglucanase activity, such as Whitezyme®.

Lipase.

The composition may comprise a lipase. Suitable lipases include those of bacterial or fungal origin. Chemically modified or protein engineered mutants are included. Examples of useful lipases include lipases from *Humicola* (synonym *Thermomyces*), e.g., from *H. lanuginosa* (*T. lanuginosus*), or from *H. insolens*, a *Pseudomonas* lipase, e.g., from *P. alcaligenes* or *P. pseudoalcaligenes*, *P. cepacia*, *P. stutzeri*, *P. fluorescens*, *Pseudomonas* sp. strain SD 705, *P. wisconsinensis*, a *Bacillus* lipase, e.g., from *B. subtilis*, *B. stearothermophilus* or *B. pumilus*.

The lipase may be a "first cycle lipase", optionally a variant of the wild-type lipase from *Thermomyces lanuginosus* comprising T231R and N233R mutations. The wild-type sequence is the 269 amino acids (amino acids 23-291) of the Swissprot accession number Swiss-Prot O59952 (derived from *Thermomyces lanuginosus* (*Humicola lanuginosa*)). Suitable lipases would include those sold under the tradenames Lipex®, Lipolex® and Lipoclean® by Novozymes, Bagsvaerd, Denmark.

The composition may comprise a variant of *Thermomyces lanuginosa* (O59952) lipase having >90% identity with the wild type amino acid and comprising substitution(s) at T231 and/or N233, optionally T231R and/or N233R.

Xyloglucanase:

Suitable xyloglucanase enzymes may have enzymatic activity towards both xyloglucan and amorphous cellulose substrates. The enzyme may be a glycosyl hydrolase (GH) selected from GH families 5, 12, 44 or 74. The glycosyl hydrolase selected from GH family 44 is particularly suitable. Suitable glycosyl hydrolases from GH family 44 are the XYG1006 glycosyl hydrolase from *Paenibacillus polyxyma* (ATCC 832) and variants thereof.

Pectate Lyase:

Suitable pectate lyases are either wild-types or variants of *Bacillus*-derived pectate lyases (CAF05441, AAU25568) sold under the tradenames Pectawash®, Pectaway® and X-Pect® (from Novozymes A/S, Bagsvaerd, Denmark).

Mannanase:

Suitable mannanases are sold under the tradenames Mannaway® (from Novozymes A/S, Bagsvaerd, Denmark), and Purabrite® (Genencor International Inc., Palo Alto, Calif.).

Bleaching Enzyme:

Suitable bleach enzymes include oxidoreductases, for example oxidases such as glucose, choline or carbohydrate oxidases, oxygenases, catalases, peroxidases, like halo-, chloro-, bromo-, lignin-, glucose- or manganese-peroxidases, dioxygenases or laccases (phenoloxidases, polyphenoloxidases). Suitable commercial products are sold under the Guardzyme® and Denilite® ranges from Novozymes. It may be advantageous for additional organic compounds, especially aromatic compounds, to be incorporated with the bleaching enzyme; these compounds interact with the bleaching enzyme to enhance the activity of the oxidoreductase (enhancer) or to facilitate the electron flow (mediator) between the oxidizing enzyme and the stain typically over strongly different redox potentials.

Other suitable bleaching enzymes include perhydrolases, which catalyse the formation of peracids from an ester substrate and peroxygen source. Suitable perhydrolases include variants of the *Mycobacterium smegmatis* perhydrolase, variants of so-called CE-7 perhydrolases, and variants of wild-type subtilisin Carlsberg possessing perhydrolase activity.

Cutinase:

Suitable cutinases are defined by E.C. Class 3.1.1.73, optionally displaying at least 90%, or 95%, or most optionally at least 98% identity with a wild-type derived from one of *Fusarium solani, Pseudomonas Mendocina* or *Humicola Insolens.*
Identity.

The relativity between two amino acid sequences is described by the parameter "identity". For purposes of the present invention, the alignment of two amino acid sequences is determined by using the Needle program from the EMBOSS package (http://emboss.org) version 2.8.0. The Needle program implements the global alignment algorithm described in Needleman, S. B. and Wunsch, C. D. (1970) J. Mol. Biol. 48, 443-453. The substitution matrix used is BLOSUM62, gap opening penalty is 10, and gap extension penalty is 0.5.
Fabric-Softener:

Suitable fabric-softening agents include clay, silicone and/or quaternary ammonium compounds. Suitable clays include montmorillonite clay, hectorite clay and/or laponite clay. A suitable clay is montmorillonite clay. Suitable silicones include amino-silicones and/or polydimethylsiloxane (PDMS). A suitable fabric softener is a particle comprising clay and silicone, such as a particle comprising montmorillonite clay and PDMS.
Flocculant:

Suitable flocculants include polyethylene oxide; for example having an average molecular weight of from 300,000 Da to 900,000 Da.
Suds Suppressor:

Suitable suds suppressors include silicone and/or fatty acid such as stearic acid.
Perfume:

Suitable perfumes include perfume microcapsules, polymer assisted perfume delivery systems including Schiff base perfume/polymer complexes, starch-encapsulated perfume accords, perfume-loaded zeolites, blooming perfume accords, and any combination thereof. A suitable perfume microcapsule is melamine formaldehyde based, typically comprising perfume that is encapsulated by a shell comprising melamine formaldehyde. It may be highly suitable for such perfume microcapsules to comprise cationic and/or cationic precursor material in the shell, such as polyvinyl formamide (PVF) and/or cationically modified hydroxyethyl cellulose (catHEC).
Aesthetic:

Suitable aesthetic particles include soap rings, lamellar aesthetic particles, geltin beads, carbonate and/or sulphate salt speckles, coloured clay particles, and any combination thereof.
Methods for Forming the Laundry Detergent Particle:

One method for forming the laundry detergent particle, or hueing particle, of the present invention includes the steps of providing a clay carrier, loading the carrier into a rotating drum or other suitable mechanical device.

The hueing agent, or coloring agent, optionally with a suitable diluent, is then added to the clay carrier in the rotating drum. The hueing agent may be added to the drum using any conventional means for adding materials to a container. For example, the hueing agent may be sprayed into the drum. The hueing agent thus comes into contact with the clay carrier to form a laundry detergent particle, or hueing particle. The hueing agent may provide a substantially uniform coating on and/or into the clay carrier. The resulting hueing particle may have a final color-on-speckle loading of 0.01% to 10%, more preferably of 0.1% to 5%.

The hueing particles may then be dried. Drying may be accomplished by any conventional means known for drying particulate materials.

The general methods for preparing the hueing particles described herein may not be construed as limiting the scope of the present invention. It should be possible, by way of alternative processing methods, to combine the hueing agent and clay carrier to produce a hueing particle which exhibits similar non-staining properties, as well as other desired features, as the hueing particles produced by the general methods described herein and by their equivalent methods as known to those skilled in the art. For instance, it may be possible to combine the clay carrier and hueing agent together in one step.
Method of Laundering Fabric:

The method of laundering fabric typically comprises the step of contacting the composition to water to form a wash liquor, and laundering fabric in said wash liquor, wherein typically the wash liquor has a temperature of above 0° C. to 90° C., or to 60° C., or to 40° C., or to 30° C., or to 20° C., or to 10° C., or even to 8° C. The fabric may be contacted to the water prior to, or after, or simultaneous with, contacting the laundry detergent composition with water. The composition can be used in pre-treatment applications.

Typically, the wash liquor is formed by contacting the laundry detergent to water in such an amount so that the concentration of laundry detergent composition in the wash liquor is from above 0 g/l to 10 g/l, or from 1 g/l, and to 9 g/l, or to 8.0 g/l, or to 7.0 g/l, or to 6.0 g/l, or to 4 g/l, or even to 3.0 g/l, or even to 2.5 g/l.

The method of laundering fabric may be carried out in a top-loading or front-loading automatic washing machine, or can be used in a hand-wash laundry application. In these applications, the wash liquor formed and concentration of laundry detergent composition in the wash liquor is that of the main wash cycle. Any input of water during any optional rinsing step(s) is not included when determining the volume of the wash liquor.

The wash liquor may comprise 70 liters or less of water, 55 liters or less of water, 40 liters or less of water, or 30 liters or less, or 20 liters or less, or 10 liters or less, or 8 liters or less, or even 6 liters or less of water. The wash liquor may comprise from above 0 to 15 liters, or from 2 liters, and to 12 liters, or even to 8 liters of water.

Typically from 0.01 kg to 2 kg of fabric per liter of wash liquor is dosed into said wash liquor.

Typically from 0.01 kg, or from 0.05 kg, or from 0.07 kg, or from 0.10 kg, or from 0.15 kg, or from 0.20 kg, or from 0.25 kg fabric per liter of wash liquor is dosed into said wash liquor.

Optionally, 150 g or less, 100 g or less, 50 g or less, or 45 g or less, or 40 g or less, or 35 g or less, or 30 g or less, or 25 g or less, or 20 g or less, or even 15 g or less, or even 10 g or less of the composition is contacted to water to form the wash liquor.

EXAMPLES

Example 1

Suitable Granular Laundry Detergent Compositions

| Ingredient | Amount (in wt %) |
| --- | --- |
| Particle in accordance with the present invention. (containing a molecule according to any of the BA formulae given above, in particular BA10, BA20, BA51, BA55, BA56, BA57, BA60, BA66, BA69, BA78) | From 0.01 wt % to 5 wt % |

| Ingredient | Amount (in wt %) |
| --- | --- |
| Anionic detersive surfactant (such as alkyl benzene sulphonate, alkyl ethoxylated sulphate and mixtures thereof) | from 8 wt % to 15 wt % |
| Non-ionic detersive surfactant (such as alkyl ethoxylated alcohol) | from 0.5 wt % to 4 wt % |
| Cationic detersive surfactant (such as quaternary ammonium compounds) | from 0 to 4 wt % |
| Other detersive surfactant (such as zwiterionic detersive surfactants, amphoteric surfactants and mixtures thereof) | from 0 wt % to 4 wt % |
| Carboxylate polymer (such as co-polymers of maleic acid and acrylic acid) | from 1 wt % to 4 wt % |
| Polyethylene glycol polymer (such as a polyethylene glycol polymer comprising poly vinyl acetate side chains) | from 0.5 wt % to 4 wt % |
| Polyester soil release polymer (such as Repel-o-tex and/or Texcare polymers) | from 0.1 to 2 wt % |
| Cellulosic polymer (such as carboxymethyl cellulose, methyl cellulose and combinations thereof) | from 0.5 wt % to 2 wt % |
| Other polymer (such as amine polymers, dye transfer inhibitor polymers, hexamethylenediamine derivative polymers, and mixtures thereof) | from 0 wt % to 4 wt % |
| Zeolite builder and phosphate builder (such as zeolite 4A and/or sodium tripolyphosphate) | from 0 wt % to 4 wt % |
| Other builder (such as sodium citrate and/or citric acid) | from 0 wt % to 3 wt % |
| Carbonate salt (such as sodium carbonate and/or sodium bicarbonate) | from 15 wt % to 30 wt % |
| Silicate salt (such as sodium silicate) | from 0 wt % to 10 wt % |
| Filler (such as sodium sulphate and/or bio-fillers) | from 10 wt % to 40 wt % |
| Source of available oxygen (such as sodium percarbonate) | from 10 wt % to 20 wt % |
| Bleach activator (such as tetraacetylethylene diamine (TAED) and/or nonanoyloxybenzenesulphonate (NOBS) | from 2 wt % to 8 wt % |
| Bleach catalyst (such as oxaziridinium-based bleach catalyst and/or transition metal bleach catalyst) | from 0 wt % to 0.1 wt % |
| Other bleach (such as reducing bleach and/or pre-formed peracid) | from 0 wt % to 10 wt % |
| Chelant (such as ethylenediamine-N'N'-disuccinic acid (EDDS) and/or hydroxyethane diphosphonic acid (HEDP) | from 0.2 wt % to 1 wt % |
| Photobleach (such as zinc and/or aluminium sulphonated phthalocyanine) | from 0 wt % to 0.1 wt % |
| Hueing agent (such as direct violet 99, acid red 52, acid blue 80, direct violet 9, solvent violet 13 and any combination thereof) | from 0 wt % to 1 wt % |
| Brightener (C.I. fluorescent brightener 260 or C.I. fluorescent brightener 351) | from 0.1 wt % to 0.4 wt % |
| Protease (such as Savinase, Savinase Ultra, Purafect, FN3, FN4 and any combination thereof) | from 0.1 wt % to 0.4 wt % |
| Amylase (such as Termamyl, Termamyl ultra, Natalase, Optisize, Stainzyme, Stainzyme Plus and any combination thereof) | from 0.05 wt % to 0.2 wt % |
| Cellulase (such as Carezyme and/or Celluclean) | from 0.05 wt % to 0.2 wt % |
| Lipase (such as Lipex, Lipolex, Lipoclean and any combination thereof) | from 0.1 to 1 wt % |
| Other enzyme (such as xyloglucanase, cutinase, pectate lyase, mannanase, bleaching enzyme) | from 0 wt % to 2 wt % |
| Fabric softener (such as montmorillonite clay and/or polydimethylsiloxane (PDMS) | from 0 wt % to 4 wt % |
| Flocculant (such as polyethylene oxide) | from 0 wt % to 1 wt % |
| Suds suppressor (such as silicone and/or fatty acid) | from 0 wt % to 0.1 wt % |
| Perfume (such as perfume microcapsule, spray-on perfume, starch encapsulated perfume accords, perfume loaded zeolite, and any combination thereof) | from 0.1 wt % to 1 wt % |
| Aesthetics (such as coloured soap rings and/or coloured speckles/noodles) | from 0 wt % to 1 wt % |
| Miscellaneous | Balance |

Example 2

Method for Forming the Particles

Sample 1-0: Large Sodium Bentonite Particles

Natural Sodium Bentonite Granular (AMCOL®) was used as received (typically 2% max>1400 m, 60%-70%>425 µm, 3% max<180 µm) as a reference in testing.

Sample 1-1: Inventive Hueing Agent Large Sodium Bentonite Particles

The dye is a hueing agent having a structure in accordance with the present invention.

1. 96.2 g of the natural sodium bentonite material (AMCOL®), as received (typically 2% max>1400 µm, 60%-70%>425 µm, 3% max<180 µm) was put into the drum of a tumble mixer. The drum continued rotating for the entire procedure, except for re-incorporation steps, detailed below.
2. 3.80 g of the inventive hueing agent solution with a color value of 4.6 were weighed out.
3. A portion of the inventive hueing agent solution was then sprayed onto the clay carrier material while the drum was rotating.
4. The drum was stopped and any material (hueing agent or solid) stuck to the walls/baffles was scrapped off, re-incorporated into the bulk, and the mixer re-tumbled, to ensure that the $1^{st}$ tranche of spray-on was homogeneously applied across the carrier, with minimal wall residues.
5. The remaining inventive hueing agent solution was then sprayed-on and homogeneously spread in multiple tranches, as per steps 3 & 4.
6. The hueing particles thus produced were then left in an open plastic beaker to dry overnight. (Final wt % moisture=3.95%)

Sample 1-2: Inventive Hueing Agent Small Bentonite Particles

The dye is a hueing agent having a structure in accordance with the present invention.

1. Natural sodium bentonite material (AMCOL®), as received (typically 2% max>1400 µm, 60%-70%>425 µm, 3% max<180 µm) was ground using a coffee grinder (Braun) to reduce the average particle size. 96.2 g of the resulting sodium bentonite material that was retained by the 106 µm sieve and through the 212 µm sieve was put into the drum of a tumble mixer.
2. 3.80 g of the inventive hueing agent solution with a color value of 4.6 were weighed out.
3. A portion of the inventive hueing agent solution was then sprayed onto the clay carrier material while the drum was rotating.
4. The drum was stopped and any material (hueing agent or solid) stuck to the walls/baffles was scrapped off, re-incorporated into the bulk, and the mixer re-tumbled, to ensure that the $1^{st}$ tranche of spray-on was homogeneously applied across the carrier, with minimal wall residues.
5. The remaining inventive hueing agent solution was then sprayed-on and homogeneously spread in multiple tranches, as per steps 3 & 4.
6. The hueing particles thus produced were then left in an open plastic beaker to dry overnight. (Final wt % moisture=~4%)

Sample 1-3: Inventive Hueing Agent Sodium Carbonate Particles

The dye is a hueing agent having a structure in accordance with the present invention.

1. 96.2 g of the sodium carbonate granular grade material (Tata) as received was put into the drum of a tumble mixer. The drum continued rotating for the entire procedure except for re-incorporation steps, detailed below.
2. 3.80 g of the inventive hueing agent solution with a color value of 4.6 were weighed out.
3. A portion of the inventive hueing agent solution was then sprayed onto the sodium carbonate carrier material while the drum was rotating.
4. The drum was stopped and any material (hueing or solid) stuck to the walls/baffles was scrapped off, re-incorporated into the bulk, and the mixer re-tumbled, to ensure that the $1^{st}$ tranche of spray-on was homogeneously applied across the carrier, with minimal wall residues.
5. The remaining inventive hueing agent solution was then sprayed-on and homogeneously spread in multiple tranches, as per steps 3 & 4.
6. The hueing particles thus produced were then left in an open plastic beaker to dry overnight. (Final wt % moisture<1%)

Sample 1-4 Liquitint® Violet DD Large Sodium Bentonite Particles 1. 88.6 g of the natural sodium bentonite material (AMCOL®), as received (typically 2% max>1400 µm, 60%-70%>425 µm, 3% max<180 µm) was put into the drum of a tumble mixer. The drum continued rotating for the entire procedure, except for re-incorporation steps, detailed below.
2. 11.4 g of the Liquitint® Violet DD solution (Milliken, Spartanburg, S.C.) with a color value of 4.5 were weighed out. This amount of Liquitint® Violet DD solution is required to match the intensity of the 3.8 g of the inventive hueing agent solution. This determination was made by measuring absorbance at 540 nm by UV-Visible spectroscopy of 100 mg of the as received materials in 1 L of deionized water.
3. A portion of the Liquitint® Violet DD solution was then sprayed onto the clay carrier material while the drum was rotating.
4. The drum was stopped and any material (hueing agent or solid) stuck to the walls/baffles was scrapped off, re-incorporated into the bulk, and the mixer re-tumbled, to ensure that the $1^{st}$ tranche of spray-on was homogeneously applied across the carrier, with minimal wall residues.
5. The remaining Liquitint® Violet DD solution was then sprayed-on and homogeneously spread in multiple tranches, as per steps 3 & 4.
6. The hueing particles thus produced were then left in an open plastic beaker to dry overnight. (Final wt % moisture=3.95%)

Sample 1-5 Liquitint® Violet DD Sodium Carbonate Particles 1. 96.2 g of the sodium carbonate granular grade material (Tata) as received was put into the drum of a tumble mixer. The drum continued rotating for the entire procedure except for re-incorporation steps, detailed below.
2. 11.4 g of the Liquitint® Violet DD solution (Milliken, Spartanburg, S.C.) with a color value of 4.5 were weighed out. This amount of Liquitint® Violet DD solution is required to match the intensity of the 3.8 g of the inventive hueing agent solution. This determination was made by measuring absorbance at 540 nm by UV-Visible spectroscopy of 100 mg of the as received materials in 1 L of deionized water.
3. A portion of the Liquitint® Violet DD solution was then sprayed onto the sodium carbonate carrier material while the drum was rotating.
4. The drum was stopped and any material (hueing or solid) stuck to the walls/baffles was scrapped off, re-incorporated into the bulk, and the mixer re-tumbled, to ensure that the $1^{st}$ tranche of spray-on was homogeneously applied across the carrier, with minimal wall residues.

5. The remaining Liquitint® Violet DD solution was then sprayed-on and homogeneously spread in multiple tranches, as per steps 3 & 4

6. The hueing particles thus produced were then left in an open plastic beaker to dry overnight. (Final wt % moisture 9.58%)

Example 3

Spot Staining Evaluation of Particles in a Detergent Composition

A total of six solid particulate laundry detergent compositions are created for testing with the base formula shown in the table below. Hueing particles were then admixed into the composition. Five compositions contain 1% of the different hueing particles, Samples 1-1 to 1-5, while Sample 1-0 contains the 1% natural sodium bentonite particles without any hueing agent.

TABLE 1

Laundry Detergent Composition

| Ingredient | wt % |
|---|---|
| sodium linear alkylbenzene sulfonate | 12% |
| alkyl ethoxylate (C14-15, EO7) | 1% |
| sodium carbonate | 53% |
| sodium sulfate | 15% |
| sodium silicate | 7% |
| citric acid | 1% |
| co-polymer of maleic acid and acrylic acid | 2% |
| misc & minors | 8% |
| Hueing particle (nil hueing reference or samples 1-1 to 1-5 as specified) | 1% |

For each composition, a 30×30 cm cotton fabric swatch was dipped into water (20° C., water hardness of 1.36 mM (3:1 $Ca^{2+}:Mg^{2+}$ molar ratio) until fully saturated. Excess water was wrung out by hand. Each fabric swatch is placed on a foil base and 30 g of the finished product containing 1% hueing particle was placed onto the swatch and spread to ensure full coverage. Swatches were left in ambient conditions for sixteen hours and the excess product was rinsed off by dipping in clean water (approximately ten times). The experiment was repeated three times. Fabrics were then photographed and assessed visually by an expert grader. The six fabrics from each experiment were ranked in terms of the degree of dye spotting. The fabric with the least spotting received a score of 1, that with the second lowest level of spotting a score of 2, and so on, so that the most spotted fabric had a score of 6. Results were then averaged across the three replicates and reported in the table below.

TABLE 2

Spot Staining Evaluation Results

| Sample (Detergent composition + 1% particle) | Overall Rank Ordering |
|---|---|
| Sample 1-0 Large Sodium Bentonite Particles, nil hue | 1 |
| Sample 1-1 Inventive Hueing Agent Large Sodium Bentonite Particles | 3 |
| Sample 1-2 Inventive Hueing Agent Small Sodium Bentonite Particles | 2 |
| Sample 1-3 Inventive Hueing Agent Sodium Carbonate Particles | 6 |

TABLE 2-continued

Spot Staining Evaluation Results

| Sample (Detergent composition + 1% particle) | Overall Rank Ordering |
|---|---|
| Sample 1-4 Liquitint ® Violet DD Large Sodium Bentonite Particles | 4 |
| Sample 1-5 Liquitint ® Violet DD Sodium Carbonate Particles | 5 |

Example 4

In Use Fabric Hueing Deposition Evaluation

A total of six solid particulate laundry detergent compositions are created for testing with the base formula shown in the table below. Hueing particles were then admixed into the composition. Five compositions contain 1% of the different hueing particles, Samples 1-1 to 1-5, while Sample 1-0 contains the 1% natural sodium bentonite particles without any hueing agent.

TABLE 3

Laundry Detergent Composition

| Ingredient | wt % |
|---|---|
| sodium linear alkylbenzene sulfonate | 12% |
| alkyl ethoxylate (C14-15, EO7) | 1% |
| sodium carbonate | 53% |
| sodium sulfate | 15% |
| sodium silicate | 7% |
| citric acid | 1% |
| co-polymer of maleic acid and acrylic acid | 2% |
| misc & minors | 8% |
| Hueing particle (nil hueing reference or samples 1-1 to 1-5 as specified) | 1% |

Each composition is run in a Tergotometer Apparatus (Copley Model 800) simulated wash with terry towel and knitted cotton fabrics (Equest) using the following typical conditions: 1.6 g in 0.8 liters of water, 2000 ppm dose, 20° C. bath temperature, water hardness of 1.36 mM (3:1 $Ca^{2+}:Mg^{2+}$ molar ratio), wash time of 15 minutes). Fabrics are rinsed once for 5 minutes and are dried in ambient conditions in the dark. Each wash pot contains three fabrics of each type and the test was repeated three times with the results averaged.

L*, a* and b* and WI CIE values are measured on each fabric using a Hunter LabScan XE reflectance spectrophotometer with D65 illumination, 10° observer and UV filter excluded. "L" is a measure of the amount of white or black in a sample; higher "L" values indicate a lighter colored sample. A measure of the amount of red or green in a sample is determined by "a*" values. A measure of the amount of blue or yellow in a sample is determined by "b*" values; lower (more negative) b* values indicate more blue on a sample. WI CIE is a measure of whiteness with higher numbers indicating greater whiteness. The table below shows the difference in the WI CIE for each sample vs. the nil hue control (Sample 1-0).

TABLE 4

In Use Hueing Deposition Evaluation Results

| Sample (Detergent composition + 1% particle) | Terry Towel, Delta WI CIE vs. Sample 1-0 | Knitted Cotton, Delta WI CIE vs. Sample 1-0 |
|---|---|---|
| Sample 1-0 Large Sodium Bentonite Particles, nil hue | 0.00# | 0.00# |
| Sample 1-1 Inventive Hueing Agent Large Sodium Bentonite Particles | 6.64* | 5.11* |
| Sample 1-2 Inventive Hueing Agent Small Sodium Bentonite Particles | 6.25* | 4.95* |
| Sample 1-3 Inventive Hueing Agent Sodium Carbonate Particles | 7.26* | 5.58* |
| Sample 1-4 Liquitint® Violet DD Large Sodium Bentonite Particles | 3.41*# | 2.45*# |
| Sample 1-5 Liquitint® Violet DD Sodium Carbonate Particles | 3.81*# | 1.81*# |

*The WI CIE difference between this Sample particle and Sample 1-0, is statistically significant $\alpha = 0.05$.
The WI CIE difference between this Sample particle and Sample 1-1 is statistically significant at $\alpha = 0.05$.

Conclusion:

The Inventive Hueing Agent bentonite particles (Samples 1-1 and 1-2) show less spotting than the comparative Liquitint® Violet DD bentonite particles (Sample 1-4). The Inventive Hueing Agent bentonite particles (Samples 1-1 and 1-2) show a statistically significant increase in WI CIE versus the nil hueing control (Sample 1-0) and a statistically significant increase in WI CIE versus the comparative Liquitint® Violet DD bentonite particles (Sample 1-4). The Inventive Hueing Agent bentonite particles (Samples 1-1 and 1-2) also provide less spotting than the Inventive Hueing Agent carbonate particles (Samples 1-3) and Liquitint® Violet DD carbonate particles (Sample 1-5).

Example 5

Staining Properties of Particles Comprising Various Bentonite Powders

Different types of bentonite clay powders were tested to evaluate the staining properties of the Inventive Hueing Agent. The clay powders include Partially Activated Bentonite Powder, and Natural Bentonite Powder; both of which were provided by AMCOL. The "Activated" grades are obtained by treating Ca-Bentonite with soda ash. The "Natural" Bentonite grade is a Natural Na-Bentonite.

The following test procedure was used to create the hueing particles:
1. 30 g of bentonite powder was measured into a small food processor.
2. The desired amount of hueing agent, or coloring agent, was measured out into a small beaker and diluted with 7.2 g of deionized water.
3. The colored solution was then blended into the powder a little at a time. If the powder began to agglomerate the sample, was put into a 60° C. oven until dry. It was then pulverized in the food processor. The final powder was passed through a No. 25 sieve.
4. The materials tested are summarized in the table below.

| Sample No. | Color/Clay Powder | Color Loading (4.5 absorb) Determined via Extraction |
|---|---|---|
| 1 | Inventive Hueing Agent/ Natural Na Bentonite | 4.03 wt % |
| 2 | Inventive Hueing Agent/ Partially Activated Bentonite | 4.27 wt % |
| 3 | Inventive Hueing Agent/ 50/50 blend of Natural Sodium & Partially Activated Bentonite | 4.37 wt % |

The following test procedure was used to evaluate fabric staining of the hueing particles in the absence of detergent in duplicate runs:
1. The test fabric piece (100% white cotton fabric) was spread in a plastic tub having dimensions of 36×24×6 cm. The fabric piece was cut to have a length of 36 cm and a width of 24 cm.
2. 0.5 liters of cold (room temperature) tap water was added to the tub.
3. 2 g of the hueing particles from the table above was evenly sprinkled on the test fabric.
4. After 90 minutes, the fabric was rinsed twice in a tub of cold tap water and allowed to air dry.
5. The fabric was evaluated for any visible stains.

The test results are shown in Table 5 below:

TABLE 5

Staining Results for Inventive Hueing Agent on Various Types of Bentonite Powders

| Sample No. | Color/Clay Powder | Amount of Staining |
|---|---|---|
| 1 | Inventive Hueing Agent/ Natural Na Bentonite | Least amount of staining |
| 2 | Inventive Hueing Agent/ Partially Activated Bentonite | Greatest amount of staining |
| 3 | Inventive Hueing Agent/ 50/50 blend of Natural Sodium & Partially Activated Bentonite | Amount of staining between that observed on Sample 1 and Sample 2 |

The test results illustrate that, for equivalent or close to equivalent color loading, the staining of the Inventive Hueing Agent on Partially Activated Bentonite was significantly worse than that of the Inventive Hueing Agent on a 50/50 blend of Partially Activated Bentonite and Natural Sodium Bentonite and on Natural Sodium Bentonite alone. The differences in staining were far greater than could be accounted for by the small differences in dye loading on the various particles. Thus, there was much less visible staining using hueing particles that contain natural bentonite.

While the test results in Table 5 indicate that natural bentonite clay material colored with the inventive hueing agent provides less staining than synthetic bentonite clay material colored with the inventive hueing agent for the fabric specimen and test method described herein, it should be recognized that the hueing agents of the present invention are suitable for use in coloring both natural and synthetic clay materials. The amount of staining observed using synthetic bentonite materials does not preclude it from use in laundry detergent compositions, or in other compositions where the inclusion of at least one hueing agent is desired. Specific material selection may be dependent upon the composition in which it is incorporated and its end-use.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A particle consisting of:
    (a) from 0.0001 wt % to 4 wt % of a hueing agent, wherein the hueing agent has the following structure:

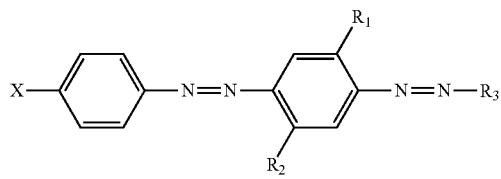

wherein:
R$_1$ and R$_2$ are independently selected from the group consisting of: H; alkyl; alkoxy; alkyleneoxy; alkyl capped alkyleneoxy; urea; and amido;
R$_3$ is a substituted aryl group;
X is a substituted group comprising sulfonamide moiety and optionally an alkyl and/or aryl moiety, and wherein the substituted group comprises at least one alkyleneoxy chain that comprises an average molar distribution of at least four alkyleneoxy moieties; and
(b) the balance, a blend of natural sodium bentonite clay and a whiter bentonite clay; wherein the whiter bentonite clay is selected from the group consisting of calcium bentonite, synthetic sodium bentonite and mixtures thereof.

2. A particle according to claim 1, wherein the hueing agent has the following structure:

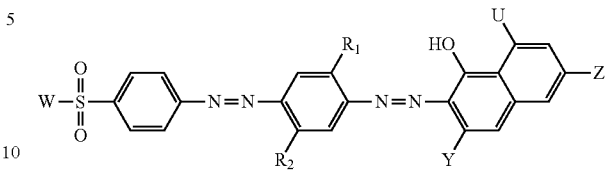

wherein:
R$_1$ and R$_2$ are independently selected from the group consisting of: H; alkyl; alkoxy; alkyleneoxy; alkyl capped alkyleneoxy; urea; and amido;
U is a hydrogen, a substituted or unsubstituted amino group;
W is a substituted group comprising an amino moiety and optionally an alkyl and/or aryl moiety, and wherein the substituted group comprises at least one alkyleneoxy chain that comprises an average molar distribution of at least four alkyleneoxy moieties;
Y is a hydrogen or a sulfonic acid moiety; and
Z is a sulfonic acid moiety or an amino group substituted with an aryl group or an alkyl group.

3. A particle according to claim 2, wherein R$_1$ is an alkoxy group and R$_2$ is an alkyl group.

4. A particle according to claim 3, wherein R$_1$ is a C$_1$-C$_{10}$ alkoxy and R$_2$ is a C$_1$-C$_{10}$ alkyl.

5. A particle according to claim 1, wherein at least 95 wt % of the blend of clays has a particle size in the range of from 50 micrometers to 2000 micrometers.

6. A particle according to claim 5, wherein at least 95 wt % of the blend of clays has a particle size in the range of from 50 micrometers to 1500 micrometers.

7. A particle according to claim 6, wherein at least 95 wt % of the blend of clays has a particle size in the range of from 50 micrometers to 1000 micrometers.

8. A particle according to claim 7, wherein at least 95 wt % of the blend of clays has a particle size in the range of from 50 micrometers to 500 micrometers.

9. A particle according to claim 8, wherein at least 95 wt % of the blend of clays has a particle size in the range of from 50 micrometers to 300 micrometers.

10. A particle according to claim 9, wherein at least 95 wt % of the blend of clays has a particle size in the range of from 50 micrometers to 200 micrometers.

11. A particle consisting of:
    (a) from 0.0001 wt % to 4 wt % of a hueing agent, wherein the hueing agent has the following structure:

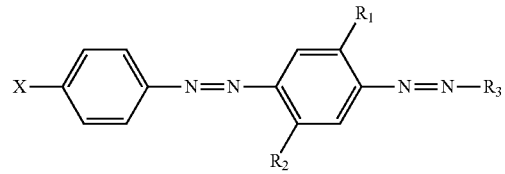

wherein:
R$_1$ and R$_2$ are independently selected from the group consisting of: H; alkyl; alkoxy; alkyleneoxy; alkyl capped alkyleneoxy; urea; and amido;
R$_3$ is a substituted aryl group;

X is a substituted group comprising sulfonamide moiety and optionally an alkyl and/or aryl moiety, and wherein the substituted group comprises at least one alkyleneoxy chain that comprises an average molar distribution of at least four alkyleneoxy moieties; and (b) the balance, a blend of natural clay and a whiter bentonite clay; wherein the whiter bentonite clay is selected from the group consisting of calcium bentonite, synthetic sodium bentonite and mixtures thereof.

12. A particle according to claim 11, wherein the natural clay is natural montmorillonite clay.

13. A particle according to claim 11, wherein the natural clay is natural bentonite clay.

14. A particle according to claim 11, wherein at least 95 wt % of the blend of clays has a particle size in the range of from 50 micrometers to 2000 micrometers.

15. A particle according to claim 14, wherein at least 95 wt % of the blend of clays has a particle size in the range of from 50 micrometers to 200 micrometers.

* * * * *